US012225607B2

(12) United States Patent
Ophardt et al.

(10) Patent No.: US 12,225,607 B2
(45) Date of Patent: Feb. 11, 2025

(54) METHOD OF CONDUCTING TWO-WAY COMMUNICATION BETWEEN SMARTPHONE AND HYGIENE APPARATUS

(71) Applicant: OP-Hygiene IP GmbH, Niederbipp (CH)

(72) Inventors: Heiner Ophardt, Arisdorf (CH); Robert Bradley, Mississauga (CA)

(73) Assignee: OP-HYGIENE IP GMBH, Niederbipp (CH)

( * ) Notice: Subject to any disclaimer, the term of this patent is extended or adjusted under 35 U.S.C. 154(b) by 326 days.

(21) Appl. No.: 17/716,535

(22) Filed: Apr. 8, 2022

(65) Prior Publication Data

US 2022/0330360 A1    Oct. 13, 2022

Related U.S. Application Data

(60) Provisional application No. 63/172,819, filed on Apr. 9, 2021.

(51) Int. Cl.
 *H04W 76/14* (2018.01)
(52) U.S. Cl.
 CPC .................. *H04W 76/14* (2018.02)
(58) Field of Classification Search
 CPC H04W 76/14; H04B 5/72; H04B 5/77; H04B 5/0031; H04B 5/0056; G06K 7/10237; G06K 7/10297
 See application file for complete search history.

(56) References Cited

U.S. PATENT DOCUMENTS

| | | |
|---|---|---|
| 8,994,996 B2 | 3/2015 | Asakura |
| 9,159,182 B2 | 10/2015 | Sagady et al. |
| 10,181,013 B2 | 1/2019 | Portney et al. |
| 10,403,121 B2 | 9/2019 | Liu et al. |
| 11,059,713 B1 | 7/2021 | Connor |
| 11,208,315 B2 | 12/2021 | Crawford et al. |
| 11,237,036 B2 | 2/2022 | Gurumohan et al. |

(Continued)

FOREIGN PATENT DOCUMENTS

EP    3001396 A1 *   3/2016   ......... G06K 7/10425

OTHER PUBLICATIONS

Chishti, Mohd Sameen, Exploring Half-Duplex Communication of NFC Read/Write Mode for Secure Multi-Factor Authentication, IEEE Access, IEEE, USA, Jan. 1, 2021 (Year: 2021).*

(Continued)

*Primary Examiner* — Angelica Perez
(74) *Attorney, Agent, or Firm* — Thorpe North & Western, LLP

(57) ABSTRACT

A method of conducting two-way communication between a first NFC enabled device and a second NFC enabled device. The method includes transmitting a write command from the first NFC enabled device to the second NFC enabled device. A silent mode of the second NFC enabled device, in which the presence of the second NFC enabled device is hidden from the first NFC enabled device, is then activated. While the silent mode is activated, the second NFC enabled device processes the write command and writes a response in a memory of the second NFC enabled device. The silent mode is then deactivated, which triggers the first NFC enabled device to read the response in the memory of the second NFC enabled device.

20 Claims, 9 Drawing Sheets

(56) References Cited

U.S. PATENT DOCUMENTS

| | | |
|---|---|---|
| 2002/0032750 A1 | 3/2002 | Kanefsky |
| 2013/0122807 A1 | 5/2013 | Tenarvitz et al. |
| 2013/0203351 A1* | 8/2013 | Hillan .................... H04B 5/00 455/41.1 |
| 2014/0148095 A1 | 5/2014 | Smith et al. |
| 2017/0210610 A1 | 7/2017 | Henson et al. |
| 2019/0127209 A1 | 5/2019 | Bergqvist |
| 2020/0327520 A1 | 10/2020 | Dyer |

OTHER PUBLICATIONS

Chishti, Mohd Sameen, Exploring Half-Duplex Communication of NFC Read/Write Mode for Secure Multi-Factor Authentication, IEEE Access, IEEE, USA, Jan. 1, 2021.

NXP Semiconductors, Product Data Sheet for NT3H2111_2211, May 27, 2019, Rev. 3.5, 82 pages.

* cited by examiner

METHOD OF CONDUCTING TWO-WAY COMMUNICATION BETWEEN SMARTPHONE AND HYGIENE APPARATUS

RELATED APPLICATION

This application claims priority to the Apr. 9, 2021 filing date of U.S. Provisional Patent Application No. 63/172,819, which is incorporated herein by reference.

FIELD OF THE INVENTION

This invention relates to methods of using Near-Field Communication (NFC), and more particularly to the use of NFC to enable two-way communication between a smartphone and a hygiene apparatus.

BACKGROUND OF THE INVENTION

NFC is a wireless technology for communicating over short distances, and is used for a variety of applications such as door lock systems and tap-to-pay. Many smartphones have a built-in NFC chip that allows the smartphone to communicate with other devices via NFC.

NFC has four main modes of operation: reader/writer mode; tag emulation mode; wireless charging mode; and peer-to-peer mode. When an NFC enabled device is in reader/writer mode, the device is able to read and/or write data to another NFC device, typically an NFC tag. When an NFC enabled device is in tag emulation mode, the NFC enabled device operates like an NFC tag, and is able to be read by another NFC enabled device. Wireless charging mode can be used to provide wireless charging to an electronic device, such as a Bluetooth headset or smart watch. Peer-to-peer mode permits two NFC enabled devices to engage in two-way communication.

While many features available in NFC electronics are shared across most models, the software and firmware that controls these electronics do not share this commonality. For example, some manufacturers of NFC enabled devices, including some smartphone manufacturers, do not enable the peer-to-peer mode and/or do not allow other developers to enable the peer-to-peer mode.

The applicant has appreciated a disadvantage of the prior art is that two-way communication between NFC enabled devices is impeded when the peer-to-peer mode is disabled or otherwise unavailable.

SUMMARY OF THE INVENTION

To at least partially overcome some of the disadvantages of previously known devices and methods, in one aspect the present invention provides a method of conducting two-way communication between a first NFC enabled device and a second NFC enabled device, including steps of: transmitting a first message from the first NFC enabled device to the second NFC enabled device; activating a silent mode of the second NFC enabled device; using the second NFC enabled device to process the first message and write a second message in a memory of the second NFC enabled device; deactivating the silent mode of the second NFC enabled device; and using the first NFC enabled device to read the second message in the memory of the second NFC enabled device.

When the second NFC enabled device is in the silent mode, the presence of the second NFC enabled device is hidden from the first NFC enabled device. From the perspective of the first NFC enabled device, activating the silent mode of the second NFC enabled device causes the second NFC enabled device to effectively disappear, even when the second NFC enabled device remains within the detectable range of the NFC field produced by the first NFC enabled device. After the second NFC enabled device is finished processing the first message and the second message is written in the memory of the second NFC enabled device, deactivating the silent mode of the second NFC enabled device causes the second NFC enabled device to reappear to the first NFC enabled device. The reappearance of the second NFC enabled device can preferably be used as a signal to the first NFC enabled device that the first message has been processed and the second message is in the memory of the second NFC enabled device, so that the first NFC enabled device can then read the second message in the memory of the second NFC enabled device.

The applicant has appreciated that, in one preferred aspect, the method of the present invention permits two-way communication between the first NFC enabled device and the second NFC enabled without requiring use of the peer-to-peer mode. For example, the method can optionally be performed with the first NFC enabled device operating in reader/writer mode, and with the second NFC enabled device operating in tag emulation mode. The method thus preferably allows for two-way communication between the first NFC enabled device and the second NFC enabled device, even if one or both of the NFC enabled devices are unable to communicate in the peer-to-peer mode.

In one preferred embodiment of the invention, the silent mode of the second NFC enabled device is a mode in which a demodulator of the second NFC enabled device is deactivated. Deactivating the demodulator preferably prevents the second NFC enabled device from receiving or sending any NFC commands, which, from the perspective of the first NFC enabled device, causes the second NFC enabled device to effectively disappear.

The first message transmitted from the first NFC enabled device to the second NFC enabled device preferably comprises a write command, which the first NFC enabled device writes in the memory of the second NFC enabled device, and which directs the second NFC enabled device to perform a task. The task may, for example, be to provide information about the status or settings of the second NFC enabled device, or to change the settings of the second NFC enabled device. The second message, which the second NFC enabled device writes in the memory of the second NFC enabled device, preferably comprises a response to the write command. The response may, for example, include information requested in the write command, or a confirmation that a task, such as a change in the settings of the second NFC enabled device, has been completed.

In one preferred embodiment, the method may be used to configure or collect data from a hygiene apparatus. The first NFC enabled device may, for example, be a smartphone, and the second NFC enabled device may, for example, be a smart paper towel dispenser. When the smartphone is placed in close proximity to an NFC chip in the paper towel dispenser, the method of the present invention may be used, for example, to configure the Wi-Fi settings of the smart paper towel dispenser to connect to a local Wi-Fi network; to collect data such as usage data stored in the smart paper towel dispenser; or to perform troubleshooting on the smart paper towel dispenser.

Accordingly, in a first aspect the present invention resides in a method of conducting two-way communication between a first NFC enabled device and a second NFC enabled device, the method comprising: placing the first NFC enabled device and the second NFC enabled device in proximity; transmitting a write command from the first NFC enabled device to the second NFC enabled device; activating a silent mode of the second NFC enabled device; using the second NFC enabled device to process the write command and write a response in a memory of the second NFC enabled device; deactivating the silent mode of the second NFC enabled device; and using the first NFC enabled device to read the response in the memory of the second NFC enabled device; wherein the presence of the second NFC enabled device is hidden from the first NFC enabled device when the second NFC enabled device is in the silent mode.

In a second aspect the present invention resides in a method, which optionally incorporates one or more features of the first aspect, wherein the first NFC enabled device comprises a smartphone.

In a third aspect the present invention resides in a method, which optionally incorporates one or more features of one or more of the first and second aspects, wherein the second NFC enabled device comprises a dispenser.

In a fourth aspect the present invention resides in a method, which optionally incorporates one or more features of one or more of the first to third aspects, wherein the second NFC enabled device comprises a hand cleaning fluid dispenser.

In a fifth aspect the present invention resides in a method, which optionally incorporates one or more features of one or more of the first to fourth aspects, wherein the second NFC enabled device comprises a hygiene apparatus.

In a sixth aspect the present invention resides in a method, which optionally incorporates one or more features of one or more of the first to fifth aspects, wherein the second NFC enabled device comprises at least one of: a paper towel dispenser, a hand cleaning fluid dispenser, a toilet paper dispenser, and a waste bin.

In a seventh aspect the present invention resides in a method, which optionally incorporates one or more features of one or more of the first to sixth aspects, wherein the first NFC enabled device is unable to communicate with the second NFC enabled device in a peer-to-peer mode.

In an eighth aspect the present invention resides in a method, which optionally incorporates one or more features of one or more of the first to seventh aspects, wherein the first NFC enabled device is unable to communicate in a peer-to-peer mode.

In a ninth aspect the present invention resides in a method, which optionally incorporates one or more features of one or more of the first to eighth aspects, wherein the first NFC enabled device has a peer-to-peer mode that is disabled.

In a tenth aspect the present invention resides in a method, which optionally incorporates one or more features of one or more of the first to ninth aspects, wherein the first NFC enabled device operates in a reader/writer mode when communicating with the second NFC enabled device.

In an eleventh aspect the present invention resides in a method, which optionally incorporates one or more features of one or more of the first to tenth aspects, further comprising: using the first NFC enabled device to read the memory of the second NFC enabled device, before the write command is transmitted from the first NFC enabled device to the second NFC enabled device.

In a twelfth aspect the present invention resides in a method, which optionally incorporates one or more features of one or more of the first to eleventh aspects, wherein the first NFC enabled device is configured to read the memory of the second NFC enabled device upon detecting the presence of the second NFC enabled device.

In a thirteenth aspect the present invention resides in a method, which optionally incorporates one or more features of one or more of the first to twelfth aspects, wherein activating the silent mode of the second NFC enabled device comprises deactivating a demodulator of the second NFC enabled device; and wherein deactivating the silent mode of the second NFC enabled device comprises activating the demodulator of the second NFC enabled device.

In a fourteenth aspect the present invention resides in a method, which optionally incorporates one or more features of one or more of the first to thirteenth aspects, wherein the second NFC enabled device is unable to communicate with the first NFC enabled device via NFC when the second NFC enabled device is in the silent mode.

In a fifteenth aspect the present invention resides in a method, which optionally incorporates one or more features of one or more of the first to fourteenth aspects, wherein the second NFC enabled device is configured to activate the silent mode upon receipt of the write command from the first NFC enabled device.

In a sixteenth aspect the present invention resides in a method, which optionally incorporates one or more features of one or more of the first to fifteenth aspects, wherein the second NFC enabled device is configured to deactivate the silent mode upon completion of the processing of the write command and the writing of the response in the memory of the second NFC enabled device.

In a seventeenth aspect the present invention resides in a method, which optionally incorporates one or more features of one or more of the first to sixteenth aspects, wherein the first NFC enabled device is configured to determine, based on the response in the memory of the second NFC enabled device, whether the write command was successfully processed.

In an eighteenth aspect the present invention resides in a method, which optionally incorporates one or more features of one or more of the first to seventeenth aspects, wherein the first NFC enabled device is configured to determine, based on the response in the memory of the second NFC enabled device, whether an error occurred in the processing of the write command.

In a nineteenth aspect the present invention resides in a method, which optionally incorporates one or more features of one or more of the first to eighteenth aspects, wherein the response has a size that is selected based on a storage capacity of the memory of the second NFC enabled device.

In a twentieth aspect the present invention resides in a method, which optionally incorporates one or more features of one or more of the first to nineteenth aspects, wherein the response has a size that is selected to extend a lifespan of the memory of the second NFC enabled device.

In a twenty first aspect the present invention resides in a method, which optionally incorporates one or more features of one or more of the first to twentieth aspects, wherein the memory of the second NFC enabled device comprises a first part and a second part; wherein the first part comprises a RAM type memory; wherein the second part comprises an EPROM type memory; wherein the size of the response is selected based on a storage capacity of the RAM type memory; and wherein the response is written in the RAM type memory.

In a twenty second aspect the present invention resides in a method, which optionally incorporates one or more features of one or more of the first to twenty first aspects, wherein the memory of the second NFC enabled device comprises a memory of an NFC chip of the second NFC enabled device.

In a twenty third aspect the present invention resides in a method, which optionally incorporates one or more features of one or more of the first to twenty second aspects, wherein the method has a first communication cycle that comprises: the transmission of the write command from the first NFC enabled device to the second NFC enabled device; the activation of the silent mode of the second NFC enabled device after the write command has been transmitted from the first NFC enabled device to the second NFC enabled device; the use of the second NFC enabled device to process the write command and write the response in the memory of the second NFC enabled device; the deactivation of the silent mode of the second NFC enabled device after completion of the processing of the write command and the writing of the response in the memory of the second NFC enabled device; and the use of the first NFC enabled device to read the response in the memory of the second NFC enabled device.

In a twenty fourth aspect the present invention resides in a method, which optionally incorporates one or more features of one or more of the first to twenty third aspects, wherein the write command is a first write command and the response is a first response; the method further comprising a second communication cycle, the second communication cycle comprising: after the first NFC enabled device reads the first response in the memory of the second NFC enabled device, transmitting a second write command from the first NFC enabled device to the second NFC enabled device; activating the silent mode of the second NFC enabled device after the second write command has been transmitted from the first NFC enabled device to the second NFC enabled device; using the second NFC enabled device to process the second write command and write a second response in the memory of the second NFC enabled device; deactivating the silent mode of the second NFC enabled device after completion of the processing of the second write command and the writing of the second response in the memory of the second NFC enabled device; and using the first NFC enabled device to read the second response in the memory of the second NFC enabled device.

In a twenty fifth aspect the present invention resides in a method, which optionally incorporates one or more features of one or more of the first to twenty fourth aspects, wherein the second response at least partially overwrites the first response in the memory of the second NFC enabled device.

In a twenty sixth aspect the present invention resides in a method, which optionally incorporates one or more features of one or more of the first to twenty fifth aspects, wherein the first response comprises a first portion of a complete response to the first write command; and wherein the second response comprises a second portion of the complete response to the first write command.

In a twenty seventh aspect the present invention resides in a method, which optionally incorporates one or more features of one or more of the first to twenty sixth aspects, wherein the complete response to the first write command requires more storage capacity than is available in the memory of the second NFC enabled device.

In a twenty eighth aspect the present invention resides in a method, which optionally incorporates one or more features of one or more of the first to twenty seventh aspects, wherein the second write command comprises an acknowledgement that the first response has been read by the first NFC enabled device.

In a twenty ninth aspect the present invention resides in a method, which optionally incorporates one or more features of one or more of the first to twenty eighth aspects, wherein processing the second write command comprises determining, from the second write command, whether the first response has been successfully read by the first NFC enabled device.

In a thirtieth aspect the present invention resides in a method, which optionally incorporates one or more features of one or more of the first to twenty ninth aspects, wherein the method comprises a plurality of communication cycles, the plurality of communication cycles including the first communication cycle and the second communication cycle; wherein, in each of the plurality of communication cycles: one of a plurality of write commands is transmitted from the first NFC enabled device to the second NFC enabled device; the silent mode of the second NFC enabled device is activated after the one of the plurality of write commands is transmitted to the second NFC enabled device; the second NFC enabled device processes the one of the plurality of write commands and writes one of a plurality of responses in the memory of the second NFC enabled device; the silent mode of the second NFC enabled device is deactivated after completion of the processing of the one of the plurality of write commands and the writing of the one of the plurality of responses in the memory of the second NFC enabled device; and the first NFC enabled device detects the presence of the second NFC enabled device after the silent mode of the second NFC enabled device has been deactivated, which triggers the first NFC enabled device to read the one of the plurality of responses in the memory of the second NFC enabled device.

In a thirty first aspect the present invention resides in a method, which optionally incorporates one or more features of one or more of the first to thirtieth aspects, wherein at least some of the plurality of responses are partial responses to one or more of the plurality of write commands; and wherein each one of the partial responses is written in the memory of the second NFC enabled device in a separate one of the plurality of communication cycles.

In a thirty second aspect the present invention resides in a method, which optionally incorporates one or more features of one or more of the first to thirty first aspects, wherein, in each of the plurality of communication cycles, the first NFC enabled device is configured to determine, based on the one of the plurality of responses in the memory of the second NFC enabled device, whether the one of the plurality of responses is a said partial response.

In a thirty third aspect the present invention resides in a method, which optionally incorporates one or more features of one or more of the first to thirty second aspects, wherein the method is used for at least one of: updating firmware of the second NFC enabled device; configuring a setting of the second NFC enabled device; configuring a Wi-Fi connection of the second NFC enabled device; performing troubleshooting on the second NFC enabled device; performing log streaming of the second NFC enabled device; collecting data from the second NFC enabled device; and updating software of the second NFC enabled device.

In a thirty fourth aspect the present invention resides in a method, which optionally incorporates one or more features of one or more of the first to thirty third aspects, wherein the first NFC enabled device is unable to detect the second NFC enabled device via NFC when the second NFC enabled device is in the silent mode.

In a thirty fifth aspect the present invention resides in a method, which optionally incorporates one or more features of one or more of the first to thirty fourth aspects, wherein the first NFC enabled device is unable to recognize the second NFC enabled device via NFC when the second NFC enabled device is in the silent mode.

In a thirty sixth aspect the present invention resides in an NFC enabled device, which optionally incorporates one or more features of one or more of the first to thirty fifth aspects, comprising: an NFC chip with a memory; the NFC chip having a silent mode that, when activated, hides the presence of the NFC enabled device from a separate NFC enabled device; the NFC enabled device being configured to: receive a write command from the separate NFC enabled device; activate the silent mode after the write command is received from the separate NFC enabled device; process the write command and write a response in the memory; deactivate the silent mode after the write command is processed and the response is written in the memory; and allow the separate NFC enabled device to read the response written in the memory.

In a thirty seventh aspect the present invention resides in an NFC enabled device, which optionally incorporates one or more features of one or more of the first to thirty sixth aspects, wherein the NFC enabled device comprises a hygiene apparatus.

In a thirty eighth aspect the present invention resides in an NFC enabled device, which optionally incorporates one or more features of one or more of the first to thirty seventh aspects, wherein the NFC enabled device comprises at least one of: a paper towel dispenser, a hand cleaning fluid dispenser; a toilet paper dispenser; and a waste bin.

In a thirty ninth aspect the present invention resides in an NFC enabled device, which optionally incorporates one or more features of one or more of the first to thirty eighth aspects, wherein the NFC enabled device is configured to be used as the second NFC enabled device in the method in accordance with any one or more of the first to thirty fifth aspects.

In a fortieth aspect the present invention resides in an NFC enabled device, which optionally incorporates one or more features of one or more of the first to thirty ninth aspects, wherein the NFC enabled device comprises an NFC chip, the NFC enabled device being configured to: detect the presence of a separate NFC enabled device; transmit a write command to the separate NFC enabled device; recognize when the presence of the separate NFC enabled device is no longer detectable via NFC; and upon subsequently detecting the presence of the separate NFC enabled device, read a response in a memory of the separate NFC enabled device.

In a forty first aspect the present invention resides in an NFC enabled device, which optionally incorporates one or more features of one or more of the first to fortieth aspects, wherein the NFC enabled device comprises a smartphone.

In a forty second aspect the present invention resides in an NFC enabled device, which optionally incorporates one or more features of one or more of the first to forty first aspects, wherein the NFC chip has a disabled peer-to-peer mode.

In a forty third aspect the present invention resides in an NFC enabled device, which optionally incorporates one or more features of one or more of the first to forty second aspects, wherein the NFC chip is unable to communicate in a peer-to-peer mode.

In a forty fourth aspect the present invention resides in an NFC enabled device, which optionally incorporates one or more features of one or more of the first to forty third aspects, wherein the NFC chip is unable to communicate with the separate NFC enabled device in a peer-to-peer mode.

In a forty fifth aspect the present invention resides in an NFC enabled device, which optionally incorporates one or more features of one or more of the first to forty fourth aspects, wherein the NFC enabled device is configured to be used as the first NFC enabled device in the method in accordance with any one or more of the first to thirty fifth aspects.

In a forty sixth aspect the present invention resides in a first NFC enabled device in combination with a second NFC enabled device, which optionally incorporate one or more features of one or more of the first to forty fifth aspects, wherein the first NFC enabled device and the second NFC enabled device are configured for performing the method in accordance with any one or more of the first to thirty fifth aspects.

In a forty seventh aspect the present invention resides in a memory having recorded thereon statements and instructions for execution by an NFC enabled device, which optionally incorporates one or more features of one or more of the first to forty sixth aspects, said statements and instructions comprising: code that allows the NFC enabled device to detect the presence of a separate NFC enabled device; code that causes the NFC enabled device to transmit a write command to the separate NFC enabled device; code that causes the NFC enabled device to recognize when the presence of the separate NFC enabled device is no longer detectable via NFC; and code that causes the NFC enabled device, upon subsequently detecting the presence of the separate NFC enabled device, to read a response in a memory of the separate NFC enabled device.

In a forty eighth aspect the present invention resides in a memory having recorded thereon statements and instructions for execution by an NFC enabled device, which optionally incorporates one or more features of one or more of the first to forty seventh aspects, wherein the statements and instructions configure the NFC enabled device for use as the first NFC enabled device in the method in accordance with any one or more of the first to thirty fifth aspects.

In a forty ninth aspect the present invention resides in a memory having recorded thereon statements and instructions for execution by an NFC enabled device, which optionally incorporates one or more features of one or more of the first to forty eighth aspects, said statements and instructions comprising: code that causes the NFC enabled device to process a write command received from a separate NFC enabled device; code that activates a silent mode of an NFC chip of the NFC enabled device, after the write command has been received from the separate NFC enabled device; code that causes the NFC enabled device to write a response in a memory of the NFC chip; and code that deactivates the silent mode of the NFC chip after the response is written in the memory of the NFC chip; wherein the silent mode of the NFC chip is a mode in which the presence of the NFC chip is hidden from the separate NFC enabled device.

In a fiftieth aspect the present invention resides in a memory having recorded thereon statements and instructions for execution by an NFC enabled device, which optionally incorporates one or more features of one or more of the first to forty ninth aspects, wherein the statements and instructions configure the NFC enabled device for use as the second NFC enabled device in the method in accordance with any one or more of the first to thirty fifth aspects.

In a fifty first aspect the present invention resides in a system, which optionally incorporates one or more features of one or more of the first to fiftieth aspects, comprising: a first NFC enabled device; and a second NFC enabled device;

wherein the first NFC enabled device is configured to detect the presence of the second NFC enabled device when the first NFC enabled device and the second NFC enabled device are in proximity; wherein the first NFC enabled device is configured to transmit a write command to the second NFC enabled device; wherein the second NFC enabled device is configured to activate a silent mode of the second NFC enabled device, after the write command is received from the first NFC enabled device; wherein the second NFC enabled device is configured to process the write command and write a response in a memory of the second NFC enabled device; wherein the second NFC enabled device is configured to deactivate the silent mode after the write command is processed and the response is written in the memory of the second NFC enabled device; wherein the first NFC enabled device is configured to read the response in the memory of the second NFC enabled device after the silent mode of the second NFC enabled device is deactivated; and wherein the presence of the second NFC enabled device is hidden from the first NFC enabled device when the second NFC enabled device is in the silent mode.

In a fifty second aspect the present invention resides in a system, which optionally incorporates one or more features of one or more of the first to fifty first aspects, wherein the system is configured for performing the method in accordance with any one or more of the first to thirty fifth aspects.

In a fifty third aspect the present invention resides in a method of conducting two-way communication between a first NFC enabled device and a second NFC enabled device, which optionally incorporates one or more features of one or more of the first to fifty second aspects, the method comprising: placing the first NFC enabled device and the second NFC enabled device in proximity; transmitting a first message from the first NFC enabled device to the second NFC enabled device; activating a silent mode of the second NFC enabled device; using the second NFC enabled device to process the first message and write a second message in a memory of the second NFC enabled device; deactivating the silent mode of the second NFC enabled device; and using the first NFC enabled device to read the second message in the memory of the second NFC enabled device; wherein the presence of the second NFC enabled device is hidden from the first NFC enabled device when the second NFC enabled device is in the silent mode.

In a fifty fourth aspect the present invention resides in a method, which optionally incorporates one or more features of one or more of the first to fifty third aspects, wherein the first NFC enabled device comprises a smartphone.

In a fifty fifth aspect the present invention resides in a method, which optionally incorporates one or more features of one or more of the first to fifty fourth aspects, wherein the second NFC enabled device comprises a dispenser.

In a fifty sixth aspect the present invention resides in a method, which optionally incorporates one or more features of one or more of the first to fifty fifth aspects, wherein the second NFC enabled device comprises a hand cleaning fluid dispenser.

In a fifty seventh aspect the present invention resides in a method, which optionally incorporates one or more features of one or more of the first to fifty sixth aspects, wherein the second NFC enabled device comprises a hygiene apparatus.

In a fifty eighth aspect the present invention resides in a method, which optionally incorporates one or more features of one or more of the first to fifty seventh aspects, wherein the second NFC enabled device comprises at least one of: a paper towel dispenser, a hand cleaning fluid dispenser, a toilet paper dispenser, and a waste bin.

In a fifty ninth aspect the present invention resides in a method, which optionally incorporates one or more features of one or more of the first to fifty eighth aspects, wherein the first NFC enabled device is unable to communicate with the second NFC enabled device in a peer-to-peer mode.

In a sixtieth aspect the present invention resides in a method, which optionally incorporates one or more features of one or more of the first to fifty ninth aspects, wherein the first NFC enabled device is unable to communicate in a peer-to-peer mode.

In a sixty first aspect the present invention resides in a method, which optionally incorporates one or more features of one or more of the first to sixtieth aspects, wherein the first NFC enabled device has a peer-to-peer mode that is disabled.

In a sixty second aspect the present invention resides in a method, which optionally incorporates one or more features of one or more of the first to sixty first aspects, wherein the first NFC enabled device operates in a reader/writer mode when communicating with the second NFC enabled device.

In a sixty third aspect the present invention resides in a method, which optionally incorporates one or more features of one or more of the first to sixty second aspects, further comprising: using the first NFC enabled device to read the memory of the second NFC enabled device, before the first message is transmitted from the first NFC enabled device to the second NFC enabled device.

In a sixty fourth aspect the present invention resides in a method, which optionally incorporates one or more features of one or more of the first to sixty third aspects, wherein the first NFC enabled device is configured to read the memory of the second NFC enabled device upon detecting the presence of the second NFC enabled device.

In a sixty fifth aspect the present invention resides in a method, which optionally incorporates one or more features of one or more of the first to sixty fourth aspects, wherein activating the silent mode of the second NFC enabled device comprises deactivating a demodulator of the second NFC enabled device; and wherein deactivating the silent mode of the second NFC enabled device comprises activating the demodulator of the second NFC enabled device.

In a sixty sixth aspect the present invention resides in a method, which optionally incorporates one or more features of one or more of the first to sixty fifth aspects, wherein the second NFC enabled device is unable to communicate with the first NFC enabled device via NFC when the second NFC enabled device is in the silent mode.

In a sixty seventh aspect the present invention resides in a method, which optionally incorporates one or more features of one or more of the first to sixty sixth aspects, wherein the second NFC enabled device is configured to activate the silent mode upon receipt of the first message from the first NFC enabled device.

In a sixty eighth aspect the present invention resides in a method, which optionally incorporates one or more features of one or more of the first to sixty seventh aspects, wherein the second NFC enabled device is configured to deactivate the silent mode upon completion of the processing of the first message and the writing of the second message in the memory of the second NFC enabled device.

In a sixty ninth aspect the present invention resides in a method, which optionally incorporates one or more features of one or more of the first to sixty eighth aspects, wherein the first NFC enabled device is configured to determine, based on the second message in the memory of the second NFC enabled device, whether the first message was successfully processed.

In a seventieth aspect the present invention resides in a method, which optionally incorporates one or more features of one or more of the first to sixty ninth aspects, wherein the first NFC enabled device is configured to determine, based on the second message in the memory of the second NFC enabled device, whether an error occurred in the processing of the first message.

In a seventy first aspect the present invention resides in a method, which optionally incorporates one or more features of one or more of the first to seventieth aspects, wherein the second message has a size that is selected based on a storage capacity of the memory of the second NFC enabled device.

In a seventy second aspect the present invention resides in a method, which optionally incorporates one or more features of one or more of the first to seventy first aspects, wherein the second message has a size that is selected to extend a lifespan of the memory of the second NFC enabled device.

In a seventy third aspect the present invention resides in a method, which optionally incorporates one or more features of one or more of the first to seventy second aspects, wherein the memory of the second NFC enabled device comprises a first part and a second part; wherein the first part comprises a RAM type memory; wherein the second part comprises an EPROM type memory; wherein the size of the second message is selected based on a storage capacity of the RAM type memory; and wherein the second message is written in the RAM type memory.

In a seventy fourth aspect the present invention resides in a method, which optionally incorporates one or more features of one or more of the first to seventy third aspects, wherein the memory of the second NFC enabled device comprises a memory of an NFC chip of the second NFC enabled device.

In a seventy fifth aspect the present invention resides in a method, which optionally incorporates one or more features of one or more of the first to seventy fourth aspects, wherein the first message comprises a write command and the second message comprises a response to the write command.

In a seventy sixth aspect the present invention resides in a method, which optionally incorporates one or more features of one or more of the first to seventy fifth aspects, wherein the method has a first communication cycle that comprises: the transmission of the write command from the first NFC enabled device to the second NFC enabled device; the activation of the silent mode of the second NFC enabled device after the write command has been transmitted from the first NFC enabled device to the second NFC enabled device; the use of the second NFC enabled device to process the write command and write the response in the memory of the second NFC enabled device; the deactivation of the silent mode of the second NFC enabled device after completion of the processing of the write command and the writing of the response in the memory of the second NFC enabled device; and the use of the first NFC enabled device to read the response in the memory of the second NFC enabled device.

In a seventy seventh aspect the present invention resides in a method, which optionally incorporates one or more features of one or more of the first to seventy sixth aspects, wherein the write command is a first write command and the response is a first response; the method further comprising a second communication cycle, the second communication cycle comprising: after the first NFC enabled device reads the first response in the memory of the second NFC enabled device, transmitting a second write command from the first NFC enabled device to the second NFC enabled device; activating the silent mode of the second NFC enabled device after the second write command has been transmitted from the first NFC enabled device to the second NFC enabled device; using the second NFC enabled device to process the second write command and write a second response in the memory of the second NFC enabled device; deactivating the silent mode of the second NFC enabled device after completion of the processing of the second write command and the writing of the second response in the memory of the second NFC enabled device; and using the first NFC enabled device to read the second response in the memory of the second NFC enabled device.

In a seventy eighth aspect the present invention resides in a method, which optionally incorporates one or more features of one or more of the first to seventy seventh aspects, wherein the second response at least partially overwrites the first response in the memory of the second NFC enabled device.

In a seventy ninth aspect the present invention resides in a method, which optionally incorporates one or more features of one or more of the first to seventy eighth aspects, wherein the first response comprises a first portion of a complete response to the first write command; and wherein the second response comprises a second portion of the complete response to the first write command.

In an eightieth aspect the present invention resides in a method, which optionally incorporates one or more features of one or more of the first to seventy ninth aspects, wherein the complete response to the first write command requires more storage capacity than is available in the memory of the second NFC enabled device.

In an eighty first aspect the present invention resides in a method, which optionally incorporates one or more features of one or more of the first to eightieth aspects, wherein the second write command comprises an acknowledgement that the first response has been read by the first NFC enabled device.

In an eighty second aspect the present invention resides in a method, which optionally incorporates one or more features of one or more of the first to eighty first aspects, wherein processing the second write command comprises determining, from the second write command, whether the first response has been successfully read by the first NFC enabled device.

In an eighty third aspect the present invention resides in a method, which optionally incorporates one or more features of one or more of the first to eighty second aspects, wherein the method comprises a plurality of communication cycles, the plurality of communication cycles including the first communication cycle and the second communication cycle; wherein, in each of the plurality of communication cycles: one of a plurality of write commands is transmitted from the first NFC enabled device to the second NFC enabled device; the silent mode of the second NFC enabled device is activated after the one of the plurality of write commands is transmitted to the second NFC enabled device; the second NFC enabled device processes the one of the plurality of write commands and writes one of a plurality of responses in the memory of the second NFC enabled device; the silent mode of the second NFC enabled device is deactivated after completion of the processing of the one of the plurality of write commands and the writing of the one of the plurality of responses in the memory of the second NFC enabled device; and the first NFC enabled device detects the presence of the second NFC enabled device after the silent mode of the second NFC enabled device has been deactivated, which triggers the first NFC enabled device to read the one of the plurality of responses in the memory of the second NFC enabled device.

In an eighty fourth aspect the present invention resides in a method, which optionally incorporates one or more features of one or more of the first to eighty third aspects, wherein at least some of the plurality of responses are partial responses to one or more of the plurality of write commands; and wherein each one of the partial responses is written in the memory of the second NFC enabled device in a separate one of the plurality of communication cycles.

In an eighty fifth aspect the present invention resides in a method, which optionally incorporates one or more features of one or more of the first to eighty fourth aspects, wherein, in each of the plurality of communication cycles, the first NFC enabled device is configured to determine, based on the one of the plurality of responses in the memory of the second NFC enabled device, whether the one of the plurality of responses is a said partial response.

In an eighty sixth aspect the present invention resides in a method, which optionally incorporates one or more features of one or more of the first to eighty fifth aspects, wherein the method is used for at least one of: updating firmware of the second NFC enabled device; configuring a setting of the second NFC enabled device; configuring a Wi-Fi connection of the second NFC enabled device; performing troubleshooting on the second NFC enabled device; performing log streaming of the second NFC enabled device; collecting data from the second NFC enabled device; and updating software of the second NFC enabled device.

In an eighty seventh aspect the present invention resides in a method, which optionally incorporates one or more features of one or more of the first to eighty sixth aspects, wherein the first NFC enabled device is unable to detect the second NFC enabled device via NFC when the second NFC enabled device is in the silent mode.

In an eighty eighth aspect the present invention resides in a method, which optionally incorporates one or more features of one or more of the first to eighty seventh aspects, wherein the first NFC enabled device is unable to recognize the second NFC enabled device via NFC when the second NFC enabled device is in the silent mode.

In an eighty ninth aspect the present invention resides in an NFC enabled device, which optionally incorporates one or more features of one or more of the first to eighty eighth aspects, comprising: an NFC chip with a memory; the NFC chip having a silent mode that, when activated, hides the presence of the NFC enabled device from a separate NFC enabled device; the NFC enabled device being configured to: receive a first message from the separate NFC enabled device; activate the silent mode after the first message is received from the separate NFC enabled device; process the first message and write a second message in the memory; deactivate the silent mode after the first message is processed and the second message is written in the memory; and allow the separate NFC enabled device to read the second message written in the memory.

In a ninetieth aspect the present invention resides in an NFC enabled device, which optionally incorporates one or more features of one or more of the first to eighty ninth aspects, wherein the NFC enabled device comprises a hygiene apparatus.

In a ninety first aspect the present invention resides in an NFC enabled device, which optionally incorporates one or more features of one or more of the first to ninetieth aspects, wherein the NFC enabled device comprises at least one of: a paper towel dispenser; a hand cleaning fluid dispenser; a toilet paper dispenser; and a waste bin.

In a ninety second aspect the present invention resides in an NFC enabled device, which optionally incorporates one or more features of one or more of the first to ninety first aspects, wherein the NFC enabled device is configured to be used as the second NFC enabled device in the method of any one or more of the first to ninety first aspects.

In a ninety third aspect the present invention resides in an NFC enabled device, which optionally incorporates one or more features of one or more of the first to ninety second aspects, comprising an NFC chip, the NFC enabled device being configured to: detect the presence of a separate NFC enabled device; transmit a first message to the separate NFC enabled device; recognize when the presence of the separate NFC enabled device is no longer detectable via NFC; and upon subsequently detecting the presence of the separate NFC enabled device, read a second message in a memory of the separate NFC enabled device.

In a ninety fourth aspect the present invention resides in an NFC enabled device, which optionally incorporates one or more features of one or more of the first to ninety third aspects, wherein the NFC enabled device comprises a smartphone.

In a ninety fifth aspect the present invention resides in an NFC enabled device, which optionally incorporates one or more features of one or more of the first to ninety fourth aspects, wherein the NFC chip has a disabled peer-to-peer mode.

In a ninety sixth aspect the present invention resides in an NFC enabled device, which optionally incorporates one or more features of one or more of the first to ninety fifth aspects, wherein the NFC chip is unable to communicate in a peer-to-peer mode.

In a ninety seventh aspect the present invention resides in an NFC enabled device, which optionally incorporates one or more features of one or more of the first to ninety sixth aspects, wherein the NFC chip is unable to communicate with the separate NFC enabled device in a peer-to-peer mode.

In a ninety eighth aspect the present invention resides in an NFC enabled device, which optionally incorporates one or more features of one or more of the first to ninety seventh aspects, wherein the NFC enabled device is configured to be used as the first NFC enabled device in the method of any one or more of the first to ninety seventh aspects.

In a ninety ninth aspect the present invention resides in a first NFC enabled device in combination with a second NFC enabled device, which optionally incorporate one or more features of one or more of the first to ninety eighth aspects, wherein the first NFC enabled device and the second NFC enabled device are configured for performing the method of any one or more of the first to ninety eighth aspects.

In a one hundredth aspect the present invention resides in a memory, which optionally incorporates one or more features of one or more of the first to ninety ninth aspects, the memory having recorded thereon statements and instructions for execution by an NFC enabled device, said statements and instructions comprising: code that allows the NFC enabled device to detect the presence of a separate NFC enabled device; code that causes the NFC enabled device to transmit a first message to the separate NFC enabled device; code that causes the NFC enabled device to recognize when the presence of the separate NFC enabled device is no longer detectable via NFC; and code that causes the NFC enabled device, upon subsequently detecting the presence of the separate NFC enabled device, to read a second message in a memory of the separate NFC enabled device.

In a one hundred and first aspect the present invention resides in a memory, which optionally incorporates one or more features of one or more of the first to one hundredth aspects, wherein the statements and instructions configure the NFC enabled device for use as the first NFC enabled device in the method of any one or more of the first to one hundredth aspects.

In a one hundred and second aspect the present invention resides in a memory, which optionally incorporates one or more features of one or more of the first to one hundred and first aspects, the memory having recorded thereon statements and instructions for execution by an NFC enabled device, said statements and instructions comprising: code that causes the NFC enabled device to process a first message received from a separate NFC enabled device; code that activates a silent mode of an NFC chip of the NFC enabled device, after the first message has been received from the separate NFC enabled device; code that causes the NFC enabled device to write a second message in a memory of the NFC chip; and code that deactivates the silent mode of the NFC chip after the second message is written in the memory of the NFC chip; wherein the silent mode of the NFC chip is a mode in which the presence of the NFC chip is hidden from the separate NFC enabled device.

In a one hundred and third aspect the present invention resides in a memory, which optionally incorporates one or more features of one or more of the first to one hundred and second aspects, wherein the statements and instructions configure the NFC enabled device for use as the second NFC enabled device in the method of any one or more of the first to one hundred and second aspects.

In a one hundred and fourth aspect the present invention resides in a system, which optionally incorporates one or more features of one or more of the first to one hundred and third aspects, the system comprising: a first NFC enabled device; and a second NFC enabled device; wherein the first NFC enabled device is configured to detect the presence of the second NFC enabled device when the first NFC enabled device and the second NFC enabled device are in proximity; wherein the first NFC enabled device is configured to transmit a first message to the second NFC enabled device; wherein the second NFC enabled device is configured to activate a silent mode of the second NFC enabled device, after the first message is received from the first NFC enabled device; wherein the second NFC enabled device is configured to process the first message and write a second message in a memory of the second NFC enabled device; wherein the second NFC enabled device is configured to deactivate the silent mode after the first message is processed and the second message is written in the memory of the second NFC enabled device; wherein the first NFC enabled device is configured to read the second message in the memory of the second NFC enabled device after the silent mode of the second NFC enabled device is deactivated; and wherein the presence of the second NFC enabled device is hidden from the first NFC enabled device when the second NFC enabled device is in the silent mode.

In a one hundred and fifth aspect the present invention resides in a system, which optionally incorporates one or more features of one or more of the first to one hundred and fourth aspects, wherein the system is configured for performing the method of any one or more of the first to one hundred and fourth aspects.

In a one hundred and sixth aspect the present invention resides in a computer readable medium, which optionally incorporates one or more features of one or more of the first to one hundred and fifth aspects, the computer readable medium storing a computer program that is executable by at least one processor, the computer program comprising sets of instructions for implementing the method of any one or more of the first to one hundred and fifth aspects.

In a one hundred and seventh aspect the present invention resides in a method, which optionally incorporates one or more features of one or more of the first to one hundred and sixth aspects, wherein the method is a method of conducting two-way communication between a first NFC enabled device and a second NFC enabled device, the method comprising: placing the first NFC enabled device and the second NFC enabled device in proximity; transmitting a first message from the first NFC enabled device to the second NFC enabled device; activating a silent mode of the second NFC enabled device; using the second NFC enabled device to process the first message and write a second message in a memory of the second NFC enabled device; deactivating the silent mode of the second NFC enabled device; and using the first NFC enabled device to read the second message in the memory of the second NFC enabled device; wherein the presence of the second NFC enabled device is hidden from the first NFC enabled device when the second NFC enabled device is in the silent mode.

In a one hundred and eighth aspect the present invention resides in a method, which optionally incorporates one or more features of one or more of the first to one hundred and seventh aspects, wherein the second NFC enabled device processes the first message during a processing time; and wherein the second NFC enabled device is in the silent mode during at least part of the processing time.

In a one hundred and ninth aspect the present invention resides in a method, which optionally incorporates one or more features of one or more of the first to one hundred and eighth aspects, wherein the first NFC enabled device comprises a smartphone; and wherein the second NFC enabled device comprises a hygiene apparatus.

In a one hundred and tenth aspect the present invention resides in a method, which optionally incorporates one or more features of one or more of the first to one hundred and ninth aspects, wherein the first NFC enabled device operates in a reader/writer mode when communicating with the second NFC enabled device.

In a one hundred and eleventh aspect the present invention resides in a method, which optionally incorporates one or more features of one or more of the first to one hundred and tenth aspects, wherein the first NFC enabled device is configured to read the memory of the second NFC enabled device upon detecting the presence of the second NFC enabled device.

In a one hundred and twelfth aspect the present invention resides in a method, which optionally incorporates one or more features of one or more of the first to one hundred and eleventh aspects, wherein activating the silent mode of the second NFC enabled device comprises deactivating a demodulator of the second NFC enabled device; wherein deactivating the silent mode of the second NFC enabled device comprises activating the demodulator of the second NFC enabled device; and wherein the second NFC enabled device is unable to communicate with the first NFC enabled device via NFC when the second NFC enabled device is in the silent mode.

In a one hundred and thirteenth aspect the present invention resides in a method, which optionally incorporates one or more features of one or more of the first to one hundred and twelfth aspects, wherein the second NFC enabled device is configured to activate the silent mode upon receipt of the first message from the first NFC enabled device.

In a one hundred and fourteenth aspect the present invention resides in a method, which optionally incorporates one or more features of one or more of the first to one hundred and thirteenth aspects, wherein the second NFC enabled device is configured to deactivate the silent mode upon completion of the processing of the first message and the writing of the second message in the memory of the second NFC enabled device.

In a one hundred and fifteenth aspect the present invention resides in a method, which optionally incorporates one or more features of one or more of the first to one hundred and fourteenth aspects, wherein the memory of the second NFC enabled device comprises a first part and a second part; wherein the first part comprises a RAM type memory; wherein the second part comprises an EPROM type memory; wherein the size of the second message is selected based on a storage capacity of the RAM type memory; wherein the second message is written in the RAM type memory; and wherein the memory of the second NFC enabled device comprises a memory of an NFC chip of the second NFC enabled device.

In a one hundred and sixteenth aspect the present invention resides in a method, which optionally incorporates one or more features of one or more of the first to one hundred and fifteenth aspects, wherein the first message comprises a write command and the second message comprises a response to the write command.

In a one hundred and seventeenth aspect the present invention resides in a method, which optionally incorporates one or more features of one or more of the first to one hundred and sixteenth aspects, wherein the method has a first communication cycle that comprises: the transmission of the write command from the first NFC enabled device to the second NFC enabled device; the activation of the silent mode of the second NFC enabled device after the write command has been transmitted from the first NFC enabled device to the second NFC enabled device; the use of the second NFC enabled device to process the write command and write the response in the memory of the second NFC enabled device; the deactivation of the silent mode of the second NFC enabled device after completion of the processing of the write command and the writing of the response in the memory of the second NFC enabled device; and the use of the first NFC enabled device to read the response in the memory of the second NFC enabled device; wherein the write command is a first write command and the response is a first response; the method further comprising a second communication cycle, the second communication cycle comprising: after the first NFC enabled device reads the first response in the memory of the second NFC enabled device, transmitting a second write command from the first NFC enabled device to the second NFC enabled device; activating the silent mode of the second NFC enabled device after the second write command has been transmitted from the first NFC enabled device to the second NFC enabled device; using the second NFC enabled device to process the second write command and write a second response in the memory of the second NFC enabled device; deactivating the silent mode of the second NFC enabled device after completion of the processing of the second write command and the writing of the second response in the memory of the second NFC enabled device; and using the first NFC enabled device to read the second response in the memory of the second NFC enabled device.

In a one hundred and eighteenth aspect the present invention resides in a method, which optionally incorporates one or more features of one or more of the first to one hundred and seventeenth aspects, wherein the first response comprises a first portion of a complete response to the first write command; and wherein the second response comprises a second portion of the complete response to the first write command.

In a one hundred and nineteenth aspect the present invention resides in a method, which optionally incorporates one or more features of one or more of the first to one hundred and eighteenth aspects, wherein the second write command comprises an acknowledgement that the first response has been read by the first NFC enabled device; and wherein processing the second write command comprises determining, from the second write command, whether the first response has been successfully read by the first NFC enabled device.

In a one hundred and twentieth aspect the present invention resides in a method, which optionally incorporates one or more features of one or more of the first to one hundred and nineteenth aspects, wherein the method comprises a plurality of communication cycles, the plurality of communication cycles including the first communication cycle and the second communication cycle; wherein, in each of the plurality of communication cycles: one of a plurality of write commands is transmitted from the first NFC enabled device to the second NFC enabled device; the silent mode of the second NFC enabled device is activated after the one of the plurality of write commands is transmitted to the second NFC enabled device; the second NFC enabled device processes the one of the plurality of write commands and writes one of a plurality of responses in the memory of the second NFC enabled device; the silent mode of the second NFC enabled device is deactivated after completion of the processing of the one of the plurality of write commands and the writing of the one of the plurality of responses in the memory of the second NFC enabled device; and the first NFC enabled device detects the presence of the second NFC enabled device after the silent mode of the second NFC enabled device has been deactivated, which triggers the first NFC enabled device to read the one of the plurality of responses in the memory of the second NFC enabled device; wherein at least some of the plurality of responses are partial responses to one or more of the plurality of write commands; wherein each one of the partial responses is written in the memory of the second NFC enabled device in a separate one of the plurality of communication cycles; and wherein, in each of the plurality of communication cycles, the first NFC enabled device is configured to determine, based on the one of the plurality of responses in the memory of the second NFC enabled device, whether the one of the plurality of responses is a said partial response.

In a one hundred and twenty first aspect the present invention resides in a method, which optionally incorporates one or more features of one or more of the first to one hundred and twentieth aspects, wherein the method is used for at least one of: updating firmware of the second NFC enabled device; configuring a setting of the second NFC enabled device; configuring a Wi-Fi connection of the second NFC enabled device; performing troubleshooting on the second NFC enabled device; performing log streaming of the second NFC enabled device; collecting data from the second NFC enabled device; and updating software of the second NFC enabled device.

In a one hundred and twenty second aspect the present invention resides in a method, which optionally incorporates one or more features of one or more of the first to one hundred and twenty first aspects, wherein the first NFC enabled device operates in a reader/writer mode when communicating with the second NFC enabled device; wherein the first NFC enabled device is configured to read the memory of the second NFC enabled device upon detecting the presence of the second NFC enabled device; wherein activating the silent mode of the second NFC enabled device comprises deactivating a demodulator of the second NFC enabled device; wherein deactivating the silent mode of the second NFC enabled device comprises activating the demodulator of the second NFC enabled device; and wherein the second NFC enabled device is unable to communicate with the first NFC enabled device via NFC when the second NFC enabled device is in the silent mode.

In a one hundred and twenty third aspect the present invention resides in a method, which optionally incorporates one or more features of one or more of the first to one hundred and twenty second aspects, wherein the second NFC enabled device is configured to activate the silent mode upon receipt of the first message from the first NFC enabled device; wherein the second NFC enabled device is configured to deactivate the silent mode upon completion of the processing of the first message and the writing of the second message in the memory of the second NFC enabled device; wherein the memory of the second NFC enabled device comprises a first part and a second part; wherein the first part comprises a RAM type memory; wherein the second part comprises an EPROM type memory; wherein the size of the second message is selected based on a storage capacity of the RAM type memory; wherein the second message is written in the RAM type memory; and wherein the memory of the second NFC enabled device comprises a memory of an NFC chip of the second NFC enabled device.

In a one hundred and twenty fourth aspect the present invention resides in a method, which optionally incorporates one or more features of one or more of the first to one hundred and twenty third aspects, wherein the first message comprises a write command and the second message comprises a response to the write command; wherein the method has a first communication cycle that comprises: the transmission of the write command from the first NFC enabled device to the second NFC enabled device; the activation of the silent mode of the second NFC enabled device after the write command has been transmitted from the first NFC enabled device to the second NFC enabled device; the use of the second NFC enabled device to process the write command and write the response in the memory of the second NFC enabled device; the deactivation of the silent mode of the second NFC enabled device after completion of the processing of the write command and the writing of the response in the memory of the second NFC enabled device; and the use of the first NFC enabled device to read the response in the memory of the second NFC enabled device; wherein the write command is a first write command and the response is a first response; the method further comprising a second communication cycle, the second communication cycle comprising: after the first NFC enabled device reads the first response in the memory of the second NFC enabled device, transmitting a second write command from the first NFC enabled device to the second NFC enabled device; activating the silent mode of the second NFC enabled device after the second write command has been transmitted from the first NFC enabled device to the second NFC enabled device; using the second NFC enabled device to process the second write command and write a second response in the memory of the second NFC enabled device; deactivating the silent mode of the second NFC enabled device after completion of the processing of the second write command and the writing of the second response in the memory of the second NFC enabled device; and using the first NFC enabled device to read the second response in the memory of the second NFC enabled device.

In a one hundred and twenty fifth aspect the present invention resides in a method, which optionally incorporates one or more features of one or more of the first to one hundred and twenty fourth aspects, wherein the first response comprises a first portion of a complete response to the first write command; wherein the second response comprises a second portion of the complete response to the first write command; wherein the second write command comprises an acknowledgement that the first response has been read by the first NFC enabled device; and wherein processing the second write command comprises determining, from the second write command, whether the first response has been successfully read by the first NFC enabled device.

In a one hundred and twenty sixth aspect the present invention resides in a method, which optionally incorporates one or more features of one or more of the first to one hundred and twenty fifth aspects, wherein the method comprises a plurality of communication cycles, the plurality of communication cycles including the first communication cycle and the second communication cycle; wherein, in each of the plurality of communication cycles: one of a plurality of write commands is transmitted from the first NFC enabled device to the second NFC enabled device; the silent mode of the second NFC enabled device is activated after the one of the plurality of write commands is transmitted to the second NFC enabled device; the second NFC enabled device processes the one of the plurality of write commands and writes one of a plurality of responses in the memory of the second NFC enabled device; the silent mode of the second NFC enabled device is deactivated after completion of the processing of the one of the plurality of write commands and the writing of the one of the plurality of responses in the memory of the second NFC enabled device; and the first NFC enabled device detects the presence of the second NFC enabled device after the silent mode of the second NFC enabled device has been deactivated, which triggers the first NFC enabled device to read the one of the plurality of responses in the memory of the second NFC enabled device; wherein at least some of the plurality of responses are partial responses to one or more of the plurality of write commands; wherein each one of the partial responses is written in the memory of the second NFC enabled device in a separate one of the plurality of communication cycles; wherein, in each of the plurality of communication cycles, the first NFC enabled device is configured to determine, based on the one of the plurality of responses in the memory of the second NFC enabled device, whether the one of the plurality of responses is a said partial response; and wherein the method is used for at least one of: updating firmware of the second NFC enabled device; configuring a setting of the second NFC enabled device; configuring a Wi-Fi connection of the second NFC enabled device; performing troubleshooting on the second NFC enabled device; performing log streaming of the second NFC enabled device; collecting data from the second NFC enabled device; and updating software of the second NFC enabled device.

BRIEF DESCRIPTION OF THE DRAWINGS

Further aspects and advantages of the invention will appear from the following description taken together with the accompanying drawings, in which.

DETAILED DESCRIPTION OF THE DRAWINGS

Figure 1:
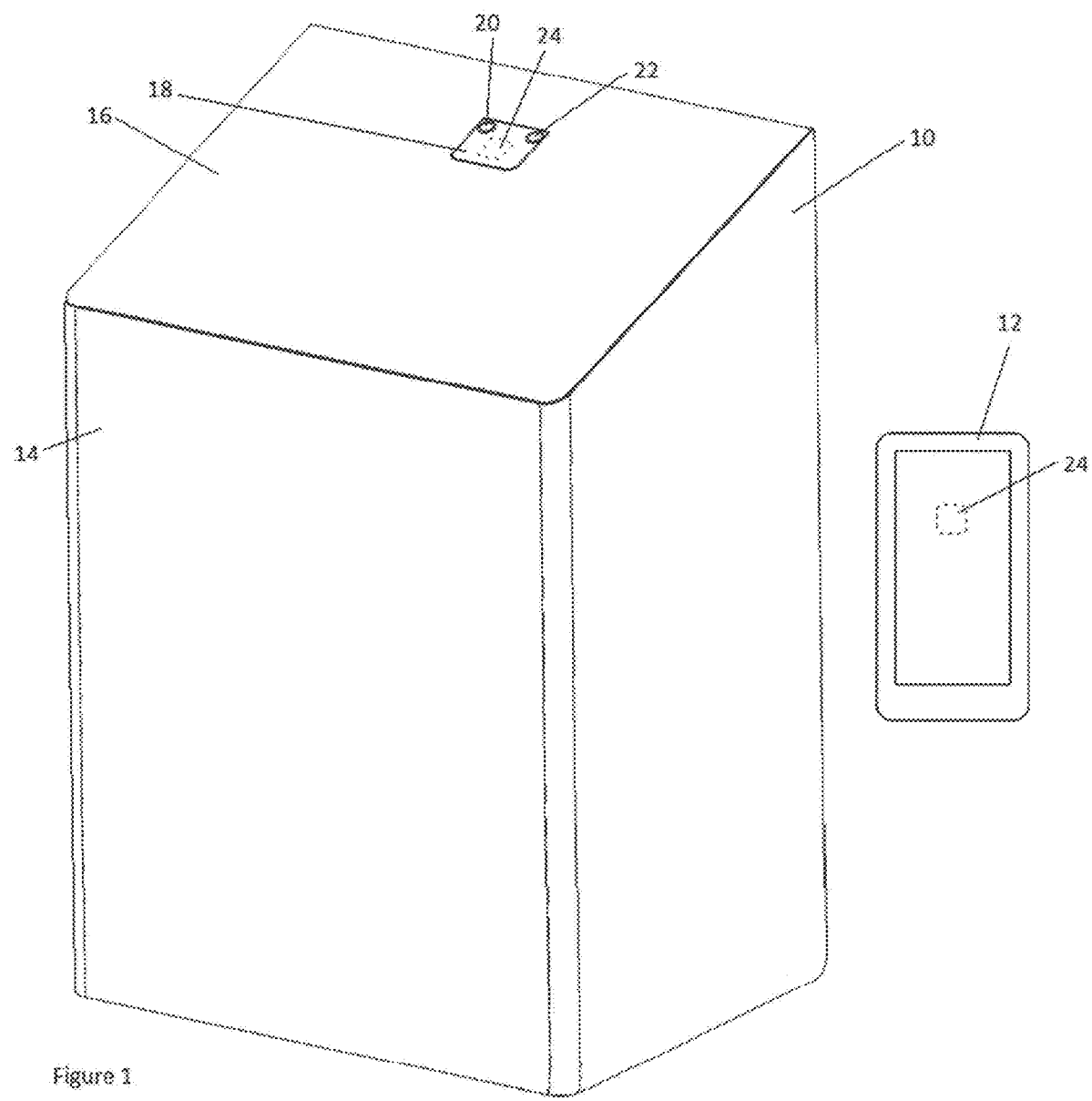
FIG. 1 is a perspective view of a paper towel dispenser and a smartphone in accordance with a first embodiment of the present invention, showing the smartphone spaced from an NFC chip of the paper towel dispenser.

FIG. 1 shows a paper towel dispenser 10 and a smartphone 12 in accordance with a first embodiment of the present invention. The smartphone 12 is also referred to herein as the first NFC enabled device 12, and the paper towel dispenser 10 is also referred to herein as the second NFC enabled device 10. The paper towel dispenser 10 has an enclosure 14 with a top panel 16, which carries a smart module 18. The smart module 18 has a first LED light 20, a second LED light 22, and an NFC chip 24, which is shown in dotted lines in FIG. 1. The paper towel dispenser 10 is configured to dispense paper towel in a manner as is known in the art. Any suitable construction of the paper towel dispenser 10 could be used.

The smart module 18 allows the paper towel dispenser 10 to perform a variety of smart functions, such as determining the quantity of paper towels in the dispenser 10; detecting when paper towels are dispensed from the dispenser 10; recording the usage history of the paper towel dispenser 10 over time; determining when the paper towel dispenser 10 needs to be refilled; determining when the paper towel dispenser 10 is empty; illuminating the first LED light 20 and/or the second LED light 22 to convey information to users of the paper towel dispenser 10 and/or to maintenance staff; and wirelessly communicating with external devices, such as computers and/or servers, via a Wi-Fi connection or other suitable wireless technology. The smart module 18 may include one or more processors, memory chips, communication devices, sensors, batteries, and/or other components suitable for providing the desired smart functionalities, as is known in the art.

Figure 3:
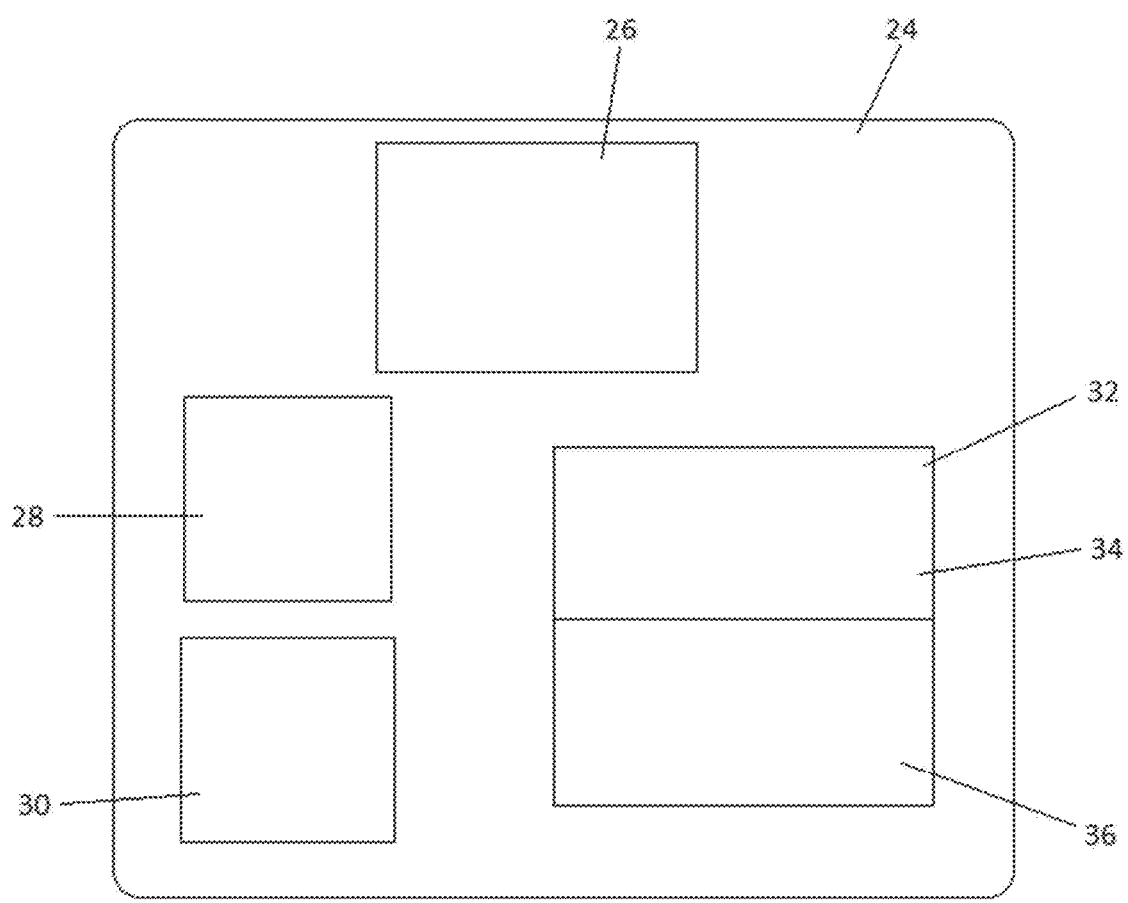
FIG. 3 is a simplified schematic representation of the NFC chip of the paper towel dispenser shown in FIG. 1.

The NFC chip 24 allows the smart module 18 to communicate over short distances via NFC with another NFC enabled device, such as the smartphone 12. A simplified schematic representation of the NFC chip 24 is shown in FIG. 3. As shown in FIG. 3, the NFC chip 24 includes an antenna 26, a demodulator 28, a control unit 30, and a memory 32. The antenna 26 allows the NFC chip 24 to communicate with another NFC enabled device, such as the smartphone 12, via an NFC field. The demodulator 28 extracts information from an NFC signal detected by the antenna 26, and outputs the information to the control unit 30. The control unit 30 processes information received from the demodulator 28, controls the operation of the NFC chip 24, and writes data to the memory 32. In the embodiment shown in FIG. 3, the memory 32 has a first part 34 and a second part 36. The first part 34 is RAM type memory, such as SRAM, and the second part 36 is EPROM type memory, such as EEPROM. In one preferred embodiment, the NFC chip 24 is the NT3H211_2211 chip manufactured by NXP. The NT3H211_2211 chip is described in "NT3H211_2211 NTAG I²C plus: NFC Forum T2T with I²C interface, password protection and energy harvesting" Product data sheet, Rev. 3.5-7 May 2019, which is incorporated herein by reference. Any other suitable type of NFC chip 24 could also be used.

The smartphone 12 is a mobile device that may be used for telecommunication, as well as the processing, display, and manipulation of data and information. The smartphone 12 may include one or more processors, memory chips, communication devices, sensors, batteries, and/or other components suitable for providing telecommunication, data processing, and other desired smart functionalities, as is known in the art. The smartphone 12 also include an NFC chip 24, as shown in dotted lines in FIG. 1. The NFC chip 24 in the smartphone 12 is optionally identical to the NFC chip 24 shown in FIG. 3, but any suitable NFC chip 24 could be used. In at least some embodiments of the invention, the manufacturer of the smartphone 12 has disabled the peer-to-peer mode of the NFC chip 24, or has otherwise limited or prevented use of the peer-to-peer mode in at least some contexts.

Figure 2:
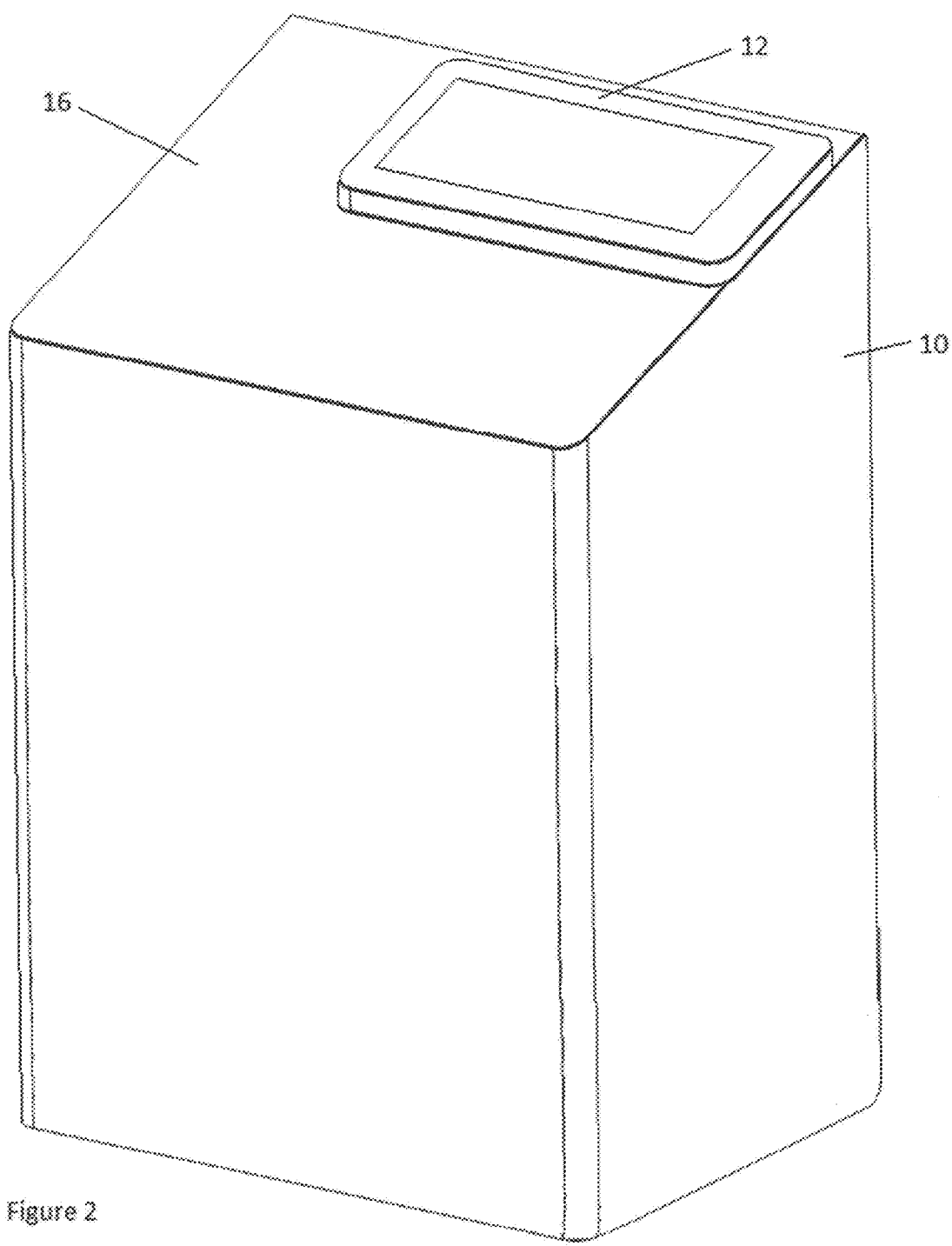
FIG. 2 is a perspective view of the paper towel dispenser and the smartphone shown in FIG. 1, showing the smartphone positioned adjacent to the NFC chip of the paper towel dispenser.

The paper towel dispenser 10 and the smartphone 12 are configured to engage in two-way communication via their respective NFC chips 24 when the smartphone 12 is brought into close proximity to the smart module 18, as shown in FIG. 2. Preferably, the paper towel dispenser 10 and the smartphone 12 are able to engage in two-way communication without requiring use of the peer-to-peer mode. The smartphone 12 and the smart module 18 preferably have software installed thereon for mediating the two-way communication. The smartphone 12 may, for example, have a mobile application for communicating with the smart module 18 that has been downloaded from the internet and installed in the memory of the smartphone 12, and the smart module 18 may, for example, have pre-installed firmware for communicating with the smartphone 12. Any other suitable method of configuring the smartphone 12 and the paper towel dispenser 10 for two-way communication could also be used. For example, the smartphone 12 could use pre-installed firmware for communicating with the smart module 18, and the smart module 18 could use software that has been downloaded from the internet for communicating with the smartphone 12. The software and/or firmware on the smartphone 12 preferably includes a library of commands that can be understood by the smart module 18.

Figure 4:
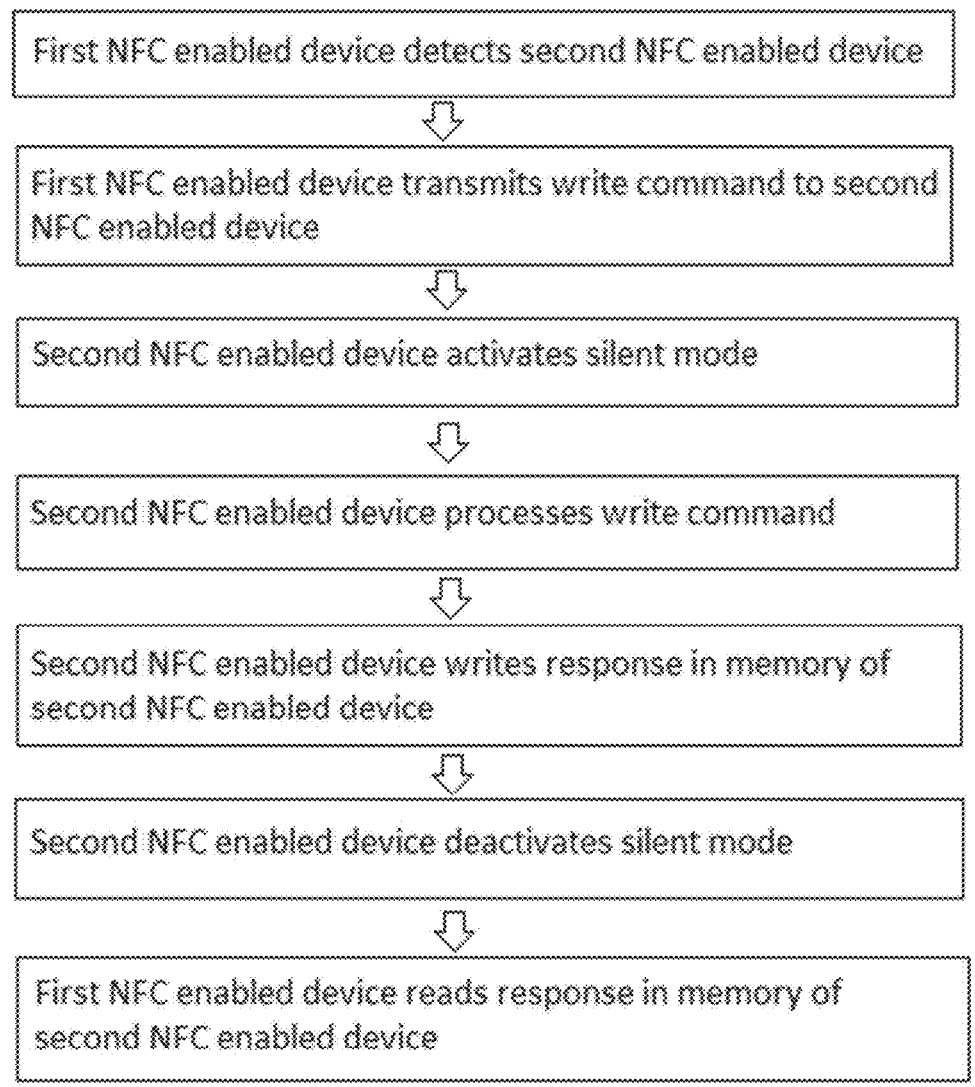
FIG. 4 is a flowchart showing a first method of conducting two-way communication between the paper towel dispenser and the smartphone shown in FIG. 1.

A first method of conducting two-way communication between the smartphone 12 and the paper towel dispenser 10 is depicted in the flowchart shown in FIG. 4. In FIG. 4, the smartphone 12 is referred to as the first NFC enabled device 12 and the paper towel dispenser 10 is referred to as the second NFC enabled device 10. The method begins when the smartphone 10 is brought into close proximity to the smart module 18 of the paper towel dispenser 10, as shown in FIG. 2. When the smartphone 10 is in close proximity to the smart module 18, the NFC chip 24 of the smartphone 12 detects the NFC chip 24 of the paper towel dispenser 10.

The detection of the NFC chip 24 in the paper towel dispenser 10 by the NFC chip 24 in the smartphone 12 may occur by any suitable mechanism. For example, the NFC chip 24 in the smartphone 12 may be in reader/writer mode, with the NFC chip 24 in the smartphone 12 producing an NFC field, and the NFC chip 24 in the paper towel dispenser 10 may be in a passive state, such as tag emulation mode, in which the NFC chip 24 in the paper towel dispenser 10 is not producing its own NFC field. When the smartphone 12 is brought into close proximity to the smart module 18, the antenna 26 in the NFC chip 24 of the smart module 18 begins to draw energy from the NFC field produced by the smartphone 12. By modulating the energy drawn from the NFC field, the NFC chip 24 in the smart module 18 is able to communicate with the NFC chip 24 in the smartphone 12, which allows the NFC chip 24 in the smartphone 12 to detect the presence of the NFC chip 24 in the smart module 18.

Alternatively, the NFC chip 24 in the smart module 18 could be in an active state, with the NFC chip 24 in the smart module 18 producing its own NFC field. The NFC chip 24 in the smartphone 12 could then detect the presence of the NFC chip 24 in the smart module 18 by detecting the NFC field produced by the NFC chip 24 in the smart module 18.

After the smartphone 12 detects the NFC chip 24 in the smart module 18, the smartphone 12 transmits a write command to the smart module 18 via NFC. The write command may, for example, be a command for the smart module 18 to provide information about the paper towel dispenser 10, such as its model number and the firmware version running on the smart module 18.

Upon receipt of the write command, the smart module 18 is configured to activate a silent mode of its NFC chip 24. When the NFC chip 24 of the smart module 18 is in the silent mode, the NFC chip 24 in the smartphone 12 is unable to detect the NFC chip 24 in the smart module 18, even if the smart module 18 remains within the detectable range of the NFC chip 24 in the smartphone 12. For example, in one preferred embodiment of the invention, the NFC chip 24 in the smart module 18 is the NT3H211_2211 chip manufactured by NXP, and activating the silent mode comprises turning on the NFC silence feature of the NT3H211_2211 chip. The NFC silence feature disables the demodulator 28 of the NFC chip 24 in the smart module 18, which causes the NFC chip 24 in the smart module 18 to effectively disappear from the perspective of the smartphone 12, even if the smart module 18 remains within the NFC field of the smartphone 12.

Any suitable method for causing the NFC chip 24 in the paper towel dispenser 10 to be hidden from the NFC chip 24 in the smartphone 12 could be used. For example, in embodiments of the invention in which the NFC chip 24 in the paper towel dispenser 10 generates its own NFC field, and the NFC chip 24 in the smartphone 12 detects the NFC field in order to detect the NFC chip 24 in the paper towel dispenser 10, the silent mode could be activated by causing the NFC chip 24 in the paper towel dispenser 10 to stop producing the NFC field.

The silent mode of the NFC chip 24 may be any mode of operating the NFC chip 24 in which a signal or feature of the NFC chip 24 is modified so as to cause the NFC chip 24 to become hidden, undetectable, or unrecognizable to another nearby NFC chip 24 for the purpose of communicating via NFC. Activating the silent mode would not necessarily cause the paper towel dispenser 10 to become hidden, undetectable, or unrecognizable to the smartphone 12 for other purposes. For example, the smartphone 12 may be able to detect the paper towel dispenser 10 via a Wi-Fi connection or using a camera while the silent mode is activated.

While the NFC chip 24 of the smart module 18 is in the silent mode, the NFC chip 24 processes the write command and writes a response in the memory 32 of the chip 24. The response may, for example, include an identification of the model number and the firmware version requested in the write command.

After the response is written in the memory 32, the silent mode of the NFC chip 24 in the smart module 18 is deactivated. This causes the NFC chip 24 in the smart module 18 to once again become detectable by the NFC chip 24 in the smartphone 12. Upon detecting the NFC chip 24 in the smart module 18, the NFC chip 24 in the smartphone 12 is configured to read the response written in the memory 32 of the NFC chip 24 of the smart module 18 via NFC.

The method as shown in FIG. 4 and described above allows the smartphone 12 and the smart module 18 in the paper towel dispenser 10 to engage in two-way communication via NFC, in which a command is transmitted from the smartphone 12 to the smart module 18, and a response to the command is provided by the smart module 18 to the smartphone 12, without requiring use of the peer-to-peer mode. The method advantageously uses the activation and deactivation of the silent mode of the NFC chip 24 in the smart module 18 to signal to the NFC chip 24 in the smartphone 12 when the command has been processed and the response is ready to be read.

Using the silent mode of the NFC chip 24 in the paper towel dispenser 10 to signal when the response is ready to be read preferably allows for more efficient two-way communication than would otherwise be possible. For example, in an alternative method, the smartphone 12 could be configured to wait a predetermined amount of time after a write command is transmitted to the paper towel dispenser 10 before reading the memory 32 of the NFC chip 24 in the paper towel dispenser 10. A possible disadvantage of this alternative method is that, if the memory 32 is read to soon, the write command may not have been processed yet and the response may not yet be in the memory 32. To avoid this problem, the predetermined time period that the smartphone 12 waits before reading the memory 32 of the NFC chip 24 in the paper towel dispenser 10 could be selected to be longer than the amount of time that would normally be required to process the write command and write the response. This, however, comes with the disadvantage that the communication may take much longer to complete. In contrast, when activation and deactivation of the silent mode is used to signal when the response is ready to be read, the communication can preferably proceed more quickly and efficiently.

In another alternative method, the smartphone 12 could be physically separated from the paper towel dispenser 10 after the write command is transmitted from the smartphone 12 to the smart module 18, and then brought back into proximity in order to read the response. This method, however, comes with the same disadvantages as the timer method described above. In particular, if the smartphone 12 is returned to its position in proximity to the smart module 18 too quickly, the response may not yet be ready to be read, and if the smartphone 12 is held away from the smart module 18 for an extended time period, then the communication may take significantly longer to complete. This method furthermore comes with the disadvantage of requiring a user to engage in a cumbersome process of physically moving the smartphone 12 towards and away from the paper towel dispenser 10, possibly many times depending on the length of the communication.

There are many possible variations on the method shown in FIG. 4 that could potentially be used in different embodiments of the invention. For example, in some embodiments of the invention, the smart module 18 could be configured to activate the silent mode after or during the processing of the write command, rather than before processing the write command as depicted in FIG. 4. In some embodiments of the invention, the smart module 18 may be configured to wait until the response is written in the memory 32 of the NFC chip 24 of the smart module 18 before the silent mode is activated and then deactivated shortly thereafter, with the activation and deactivation of the silent mode acting as a signal to the smartphone 12 that the response is ready to be read. It is preferred, however, for the smart module 18 to be in the silent mode while the write command is being processed, as this reduces the overall length of time required for the two-way communication. In particular, processing the write command while in the silent mode avoids the extra time that would otherwise be required to activate and then deactivate the silent mode after the write command is processed.

Figure 5:
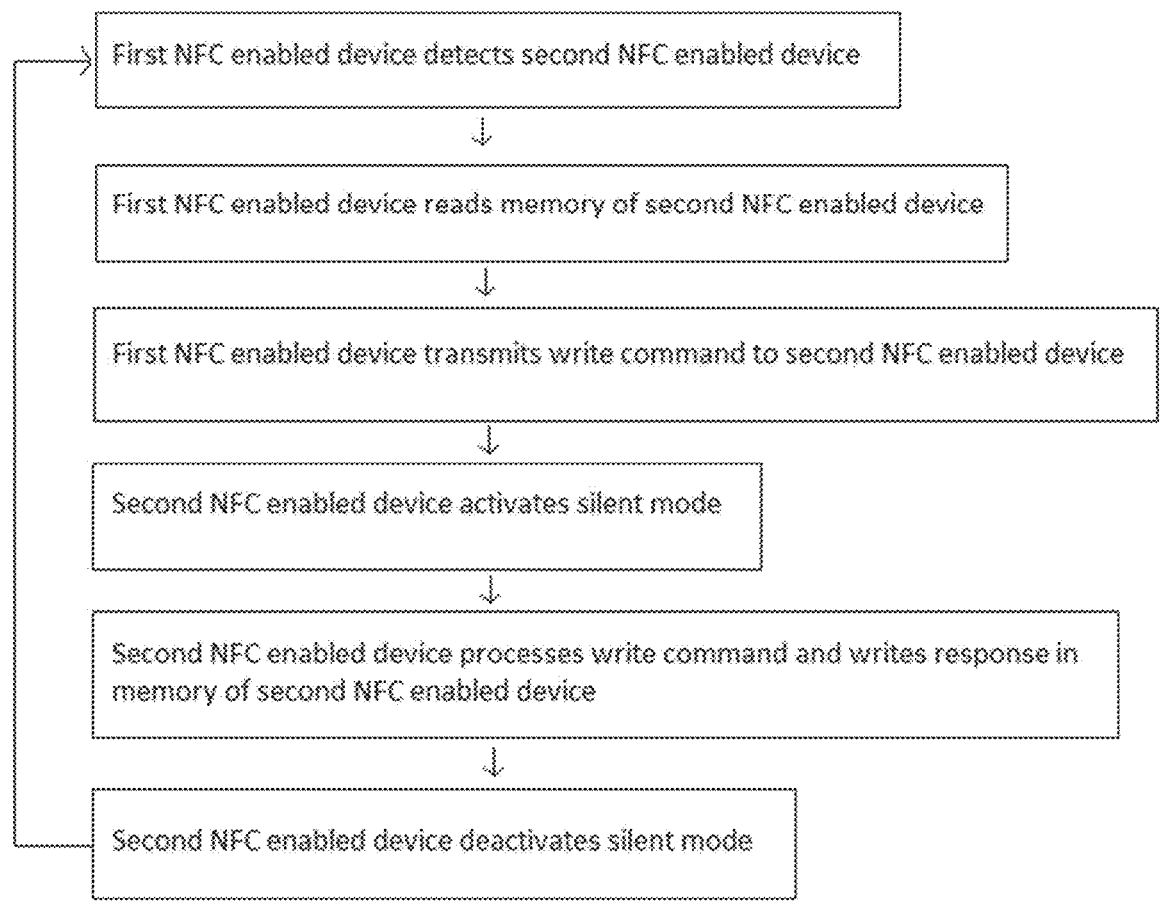
FIG. 5 is a flowchart showing a second method of conducting two-way communication between the paper towel dispenser and the smartphone shown in FIG. 1.

Preferably, the smartphone 12 and the smart module 18 of the paper towel dispenser 10 are able to engage in an extended two-way communication that includes a plurality of communication cycles. A flowchart showing an example of a communication cycle is shown in FIG. 5. The communication cycle begins when the NFC chip 24 in the smartphone 12 detects the NFC chip 24 in the paper towel dispenser 10. The NFC chip 24 in the smartphone 12 then reads the memory 32 of the NFC chip 24 in the paper towel dispenser 10, which may for example carry information that identifies the paper towel dispenser 10 so that the smartphone 12 knows which device it is communicating with. The NFC chip 24 in the smartphone 12 then sends a write command to the NFC chip 24 in the paper towel dispenser 10. The write command may, for example, direct the smart module 18 to provide information about the Wi-Fi configuration of the smart module 18. The smart module 18 then activates the silent mode of its NFC chip 24, processes the write command, and writes a response in the memory 32. Once the response is written in the memory 32, the silent mode is deactivated, which ends the first communication cycle.

The deactivation of the silent mode causes the smartphone 12 to again detect the NFC chip 24 in the paper towel dispenser 10, which begins the next communication cycle. Upon detecting the NFC chip 24 in the paper towel dispenser 10, the NFC chip 24 in the smartphone 12 reads the memory 32 of the NFC chip 24 in the paper towel dispenser 10, retrieving the information regarding the Wi-Fi configuration requested in the first communication cycle. The smartphone 12 then transmits a second write command to the NFC chip 24 in the smart module 18, which may for example include instructions for the smart module 18 to connect to a specified Wi-Fi network. The smart module 18 then activates the silent mode of its NFC chip 24, processes the second write command, and writes a second response in the memory 32.

The second response may, for example, include a confirmation that the smart module 18 has been configured to connect to the specified Wi-Fi network. Once the response is written in the memory 32, the silent mode is deactivated, which ends the second communication cycle.

The process then continues with a third communication cycle, in which the smartphone 12 again detects the NFC chip 24 in the paper towel dispenser 10, and then reads the second response in the memory 32 of the NFC chip 24. This can continue indefinitely, with any number of communication cycles occurring as required to achieve the desired two-way communication between the smartphone 12 and the paper towel dispenser 10.

Figure 6:
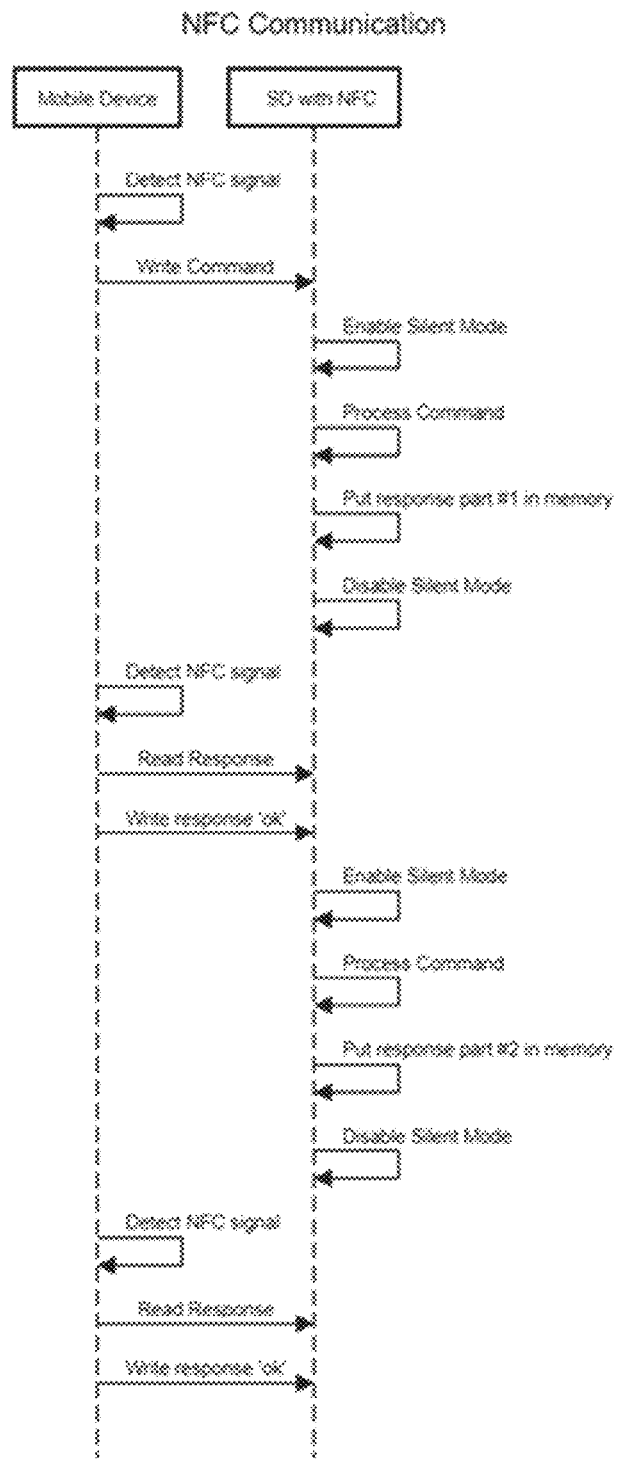
FIG. 6 is a communication diagram showing a third method of conducting two-way communication between the paper towel dispenser and the smartphone shown in FIG. 1.

In some embodiments of the invention, the memory 32 of the NFC chip 24 in the paper towel dispenser 10 may not have sufficient storage capacity to contain the complete response to a written command received from the smartphone 12. In such cases, the smart module 18 is preferably configured to divide the complete response into multiple partial responses, and to write each partial response in the memory 32 of the NFC chip 24 in a separate communication cycle. One method for communicating a complete response over multiple communication cycles is shown, for example, in FIG. 6. In FIG. 6, the smartphone 12 is identified as "Mobile Device", and the paper towel dispenser 10 is identified as the "SD with NFC", where SD stands for "Smart Device".

The method shown in FIG. 6 proceeds similarly to the methods described above, with the smartphone 12 initially detecting the NFC chip 24 of the paper towels dispenser 10. The NFC chip 24 in the smartphone 12 then transmits a write command to the NFC chip 24 in the paper towel dispenser 10. After receiving the write command, the NFC chip 24 in the paper towel dispenser 10 then enables the silent mode, processes the command, and writes a response in the memory 32. In this case, a complete response to the write command is too large to fit in the memory 32 of the NFC chip 24 of the paper towel dispenser 10, and so the complete response is divided into multiple partial responses, and a first one of the partial responses is written in the memory 32 (referred to as "response part #1" in FIG. 6).

The NFC chip 24 in the paper towel dispenser 10 then disables the silent mode, which allows the NFC chip 24 in the smartphone 12 to once again detect the NFC chip 24 in the paper towel dispenser 24. Upon detecting the NFC chip 24 in the paper towel dispenser 10, the smartphone 12 reads the partial response written in the memory 32 of the NFC chip 24 of the paper towel dispenser 10.

The partial response written in the memory 32 of the NFC chip 24 of the paper towel dispenser 10 optionally includes a label or marker that the smartphone 12 is configured to recognize as indicating that the response is a partial response to the previous command. Alternatively, the smartphone 12 may be configured to use any other suitable method to determine whether the response is a complete response or a partial response. When a partial response is detected, the smartphone 12 records the partial response in the memory of the smartphone 12, and then sends a further write command to the NFC chip 24 in the paper towel dispenser 10. The further write command preferably includes an acknowledgement that the partial response has been successfully read, and directs the smart module 18 to provide the next part of the complete response. The further write command is labelled as "Write response 'ok'" in FIG. 6.

Upon receiving the further write command, the smart module 18 again activates the silent mode of the NFC chip 24, processes the write command, and writes a response in the memory 32 of the NFC chip 24, the response comprising the second part of the complete response to the first write command. The silent mode of the NFC chip 24 in the paper towel dispenser 10 is then deactivated, allowing the smartphone 12 to detect the NFC chip 24 in the paper towel dispenser 10 and then read the response in the memory 32 of the NFC chip 24. This process can continue indefinitely, with as many communication cycles as necessary to provide the complete response to the original write command. Preferably, the final partial response includes a message terminator that is understood by the smartphone 12 as indicating that the complete response to the write command has now been provided. The smart module 18 is preferably configured to always provide a message terminator after a complete response has been provided, regardless of whether the complete response was provided in one communication cycle or over multiple communication cycles. The smartphone 12 may, for example, be configured to determine that a response is a partial response and that additional communication cycles are required to obtain the complete response whenever a response is read that does not include the message terminator.

The size of each response written in the memory 32 of the NFC chip 24 of the paper towel dispenser 10 is preferably selected based on the available storage capacity of the memory 32. For example, in one embodiment of the invention the memory 32 of the NFC chip 24 of the paper towel dispenser 10 has up to 884 bytes available for each response. In this embodiment, the smart module 18 is preferably configured to divide each complete response into partial responses that are no larger than 884 bytes.

Each time that the smart module 18 writes a new response to a write command, the new response generally overwrites the previous response that was stored in the memory 32. In some embodiments of the invention, the memory 32 of the NFC chip 24 may have one portion that can only be rewritten a certain number of times before failing, and another portion that can be rewritten a greater number of times before failing, or that has no limit to the number of possible rewrites. For example, in the NFC chip 24 shown in FIG. 3, the first part 34 of the memory 32, which is a RAM type memory, may be able to be rewritten an unlimited number of times, while the second part 36 of the memory 32, which is an EPROM type memory, may have a limit of about 500,000 rewrites before failing. The first part 34 may, for example, have a storage capacity of about 64 bytes, and the second part 36 may, for example, have a storage capacity of about 888 bytes.

In order to extend the useful lifespan of the memory 32, the smart module 18 is preferably configured to, in at least some circumstances, write responses in the first part 34 of the memory 32 rather than the second part 36 of the memory 32. For example, in some embodiments of the invention the smart module 18 may be configured to divide a complete response to a write command into multiple partial responses that are written in the first part 34 of the memory 32 over multiple communication cycles, even if the complete response could be written in the second part 36 of the memory in one communication cycle, or in a comparatively smaller number of communication cycles. This increase in the number of communication cycles can preferably occur without significantly increasing the amount of time required to complete the communication, due to the efficient two-way communication that is preferably enabled by the use of the silent mode of the NFC chip 24 to signal when a write command has been processed and a response is written in the memory 32.

Figure 7:
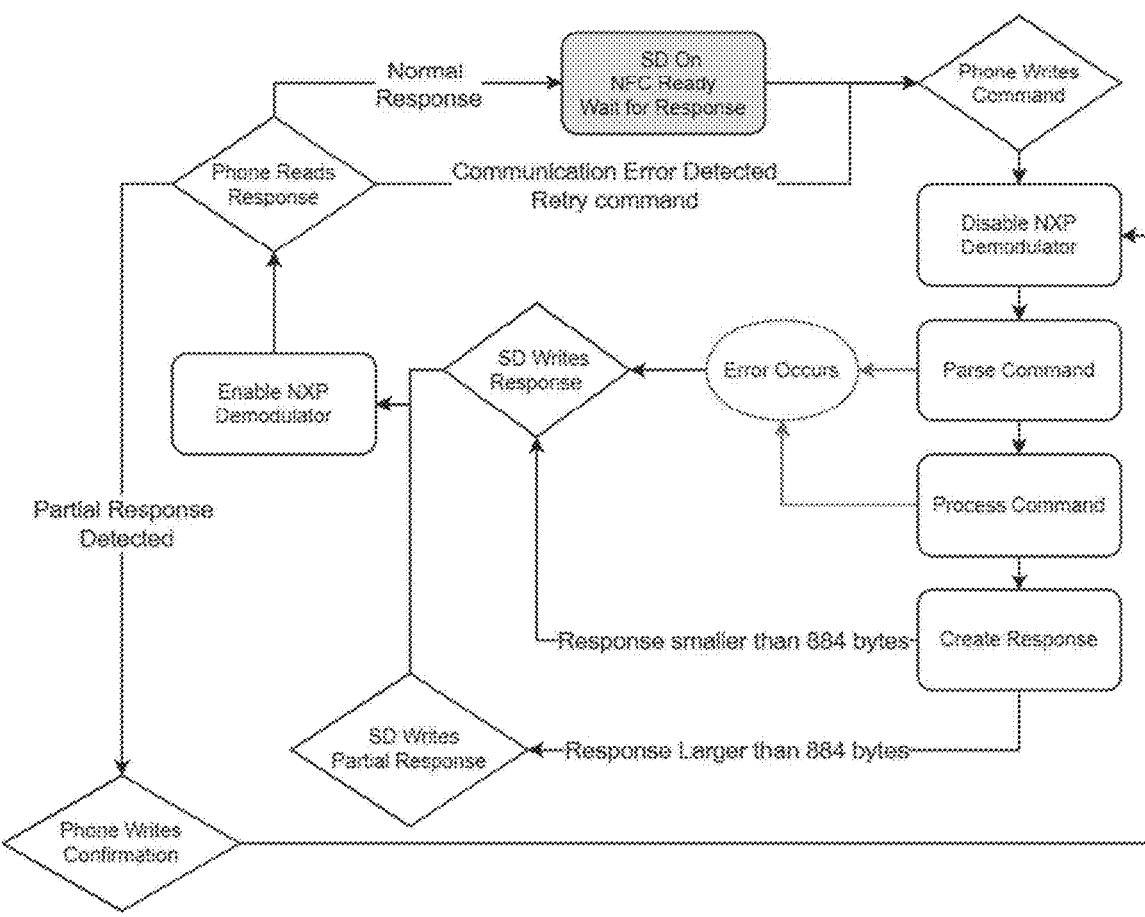
FIG. 7 is a state diagram showing a fourth method of conducting two-way communication between the paper towel dispenser and the smartphone shown in FIG. 1.

Reference is now made to FIG. 7, which shows a more detailed state diagram depicting a method of conducting two-way communication between the smartphone 12 and the smart module 18 of the paper towel dispenser 10. In FIG. 7, the paper towel dispenser 10 is referred to as "SD" and the NFC chip 24 of the paper towel dispenser 10 is referred to as "NXP".

The method depicted in FIG. 7 is similar to the methods described above, but includes additional details. For example, in FIG. 7 it can be seen that, if an error occurs when the command is being parsed and/or processed by the smart module 18, the smart module 18 writes a response in the memory 32 of the NFC chip 24. The response preferably indicates that an error has occurred. The smartphone 12 can then, for example, retry the command. If the error is repeated one or more additional times, the smartphone 12 may be configured to provide a notification to a user that an error has occurred, and may for example provide troubleshooting instructions.

In the embodiment shown in FIG. 7, the available storage capacity of the memory 32 is 884 bytes. If the response to the write command is smaller than 884 bytes, the complete response is written in the memory 32, which is then read by the smartphone 12 after the silent mode has been deactivated (e.g. by enabling the demodulator of the NFC chip 24). If the response to the write command is larger than 884 bytes, a partial response is written in the memory 32. When the smartphone 12 detects that the response is a partial response, the smartphone 12 transmits a confirmation that the partial response has been read. Upon receipt of the confirmation, the NFC chip 24 in the paper towel dispenser 10 activates the silent mode (e.g. disables the demodulator), processes the confirmation, and then writes the next part of the complete response in the memory 32. This cycle then repeats until the complete response to the write command has been provided to the smartphone 12.

Figure 8:
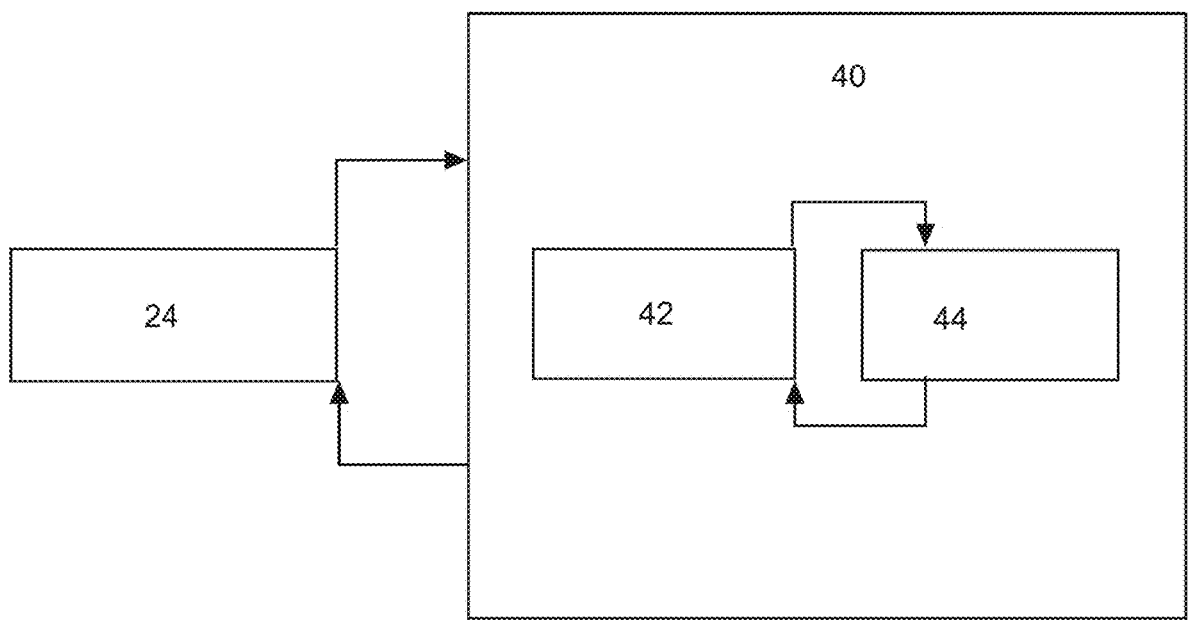
FIG. 8 is a block diagram of a microcontroller of the paper towel dispenser shown in FIG. 1.

Reference is now made to FIG. 8, which shows a block diagram of a microcontroller 40 of the smart module 18 of the paper towel dispenser 10. The microcontroller 40 has a processor 42 and a flash memory 44. The microcontroller 40 is connected to the NFC chip 24 and preferably helps to control the operation of the NFC chip 24. The microcontroller 40 may also be connected to additional components of the smart module 18, such as the first LED light 20 and the second LED light 22, and may be used for providing a variety of different smart functionalities of the paper towel dispenser 10.

The microcontroller 40 is preferably used in conjunction with the NFC chip 24 to perform the two-way communication between the paper towel dispenser 10 and the smartphone 12 as described above. For example, in one preferred embodiment the NFC chip 24 is programed to send an interrupt message to the microcontroller 40 when a write command is received from the smartphone 12 and is written in the memory 32 of the NFC chip 24. Upon receipt of the interrupt message, the microcontroller 40 is programmed to stop, pause or complete any processing tasks that the microcontroller 40 is performing; to read the write command written in the memory 32 of the NFC chip 24; and to activate the silent mode of the NFC chip 24. The microcontroller 40 is programmed to then process the write command, which may for example include configuring a setting of the smart module 18, updating software of the smart module 18, and/or compiling usage data stored in the flash memory 44.

The microcontroller 40 is programmed to then prepare a response to the write command, which is stored in the flash memory 44. The response may, for example, include a confirmation that a setting has been changed, a collection of usage data about the dispenser 10, and/or a confirmation that the software of the smart module 18 has been updated. The microcontroller 40 is programmed to compare the size of the response to the storage capacity of the memory 32 of the NFC chip 24, and if the response is too large to fit in the memory 32, the microcontroller 40 is programmed to divide the response into multiple partial responses. The microcontroller 40 is programmed to then write the response, or if the response is too large, the first partial response, into the memory 32 of the NFC chip 24. Once the response or partial response is written in the memory 32, the microcontroller 40 is programmed to deactivate the silent mode of the NFC chip 24, so that the smartphone 12 can then read the response or partial response in the memory 32 of the NFC chip 24.

Upon receipt of a further write command from the smartphone 12, the NFC chip 24 of the paper towel dispenser 10 is configured to again send an interrupt message to the microcontroller 40. Upon receipt of the interrupt message, the microcontroller 40 is configured to again read the write command written in the memory 32 of the NFC chip 24; activate the silent mode of the NFC chip 24; process the write command and prepare a response; write the response or a part of the response in the memory 32 of the NFC chip 24; and deactivate the silent mode of the NFC chip 24. This process can be repeated as many times as necessary to complete the two-way communication between the smartphone 12 and the paper towel dispenser 10.

In one preferred embodiment, at least some of the messages and preferably all of the messages sent from the smartphone 12 to the NFC chip 24 of the paper towel dispenser 10 include a password and/or a login credential that is recognized by the microcontroller 40. If a message is received from the smartphone 12 that does not include the correct password and/or login credential, the microcontroller 40 is preferably configured to take an appropriate action. The appropriate action may, for example, be to write a response in the memory 32 of the NFC chip 24 indicating that the password and/or login credential was not recognized, or that an error occurred. The microcontroller 40 is preferably programmed so that no information about the operation of the dispenser 10 can be collected, and no changes to the settings or software of the dispenser 10 can be changed via the two-way NFC communication unless the correct password and/or login credential is provided by the smartphone 12.

Optionally, different users of the paper towel dispenser 10 may be given different login credentials, with each user having their own smartphone 12 for communicating with the paper towel dispenser 10 using their individual login credentials. For example, maintenance staff at the facility where the paper towel dispenser 10 is located may be given a first type of login credential, and the manager of the facility may be given a second type of login credential.

Each user's smartphone 12 is preferably configured to include his or her login credentials in each message that is sent via NFC from the smartphone 12 to the NFC chip 24 in the paper towel dispenser 10, and the microcontroller 40 is preferably configured to recognize and distinguish between the different login credentials. The microcontroller 40 may also be configured to provide different layers of access, depending on the login credential that is used. For example, the microcontroller 40 may be configured to allow NFC messages containing the first type of login credential to be used to change certain settings of the dispenser 10, but not others. The microcontroller 40 may furthermore be configured to allow NFC messages containing the second type of login credential to be used to change all of the settings of the dispenser 10. The second type of login credential could also be required, for example, to update the software or firmware of the smart module 18, or for collecting usage data from the dispenser 10.

Figure 9:
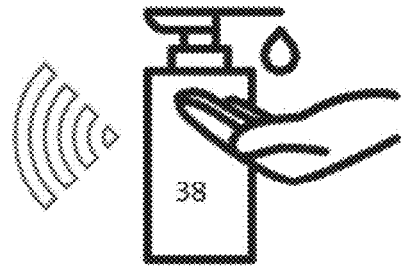
FIG. 9 is simplified diagram showing a method of conducting two-way communication between a smartphone and a hand cleaning fluid dispenser in accordance with a second embodiment of the present invention.
Figure 9:
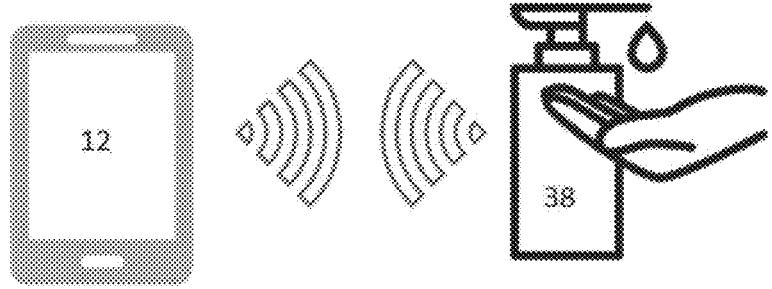
Figure 9:
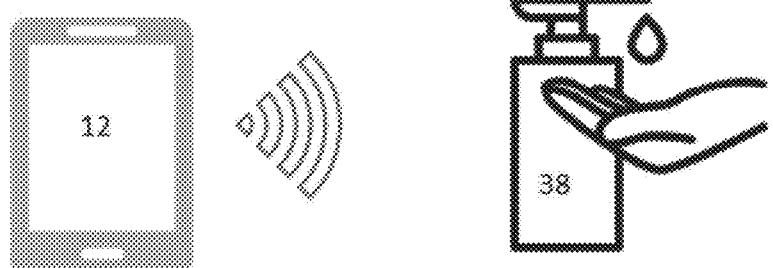
Figure 9:
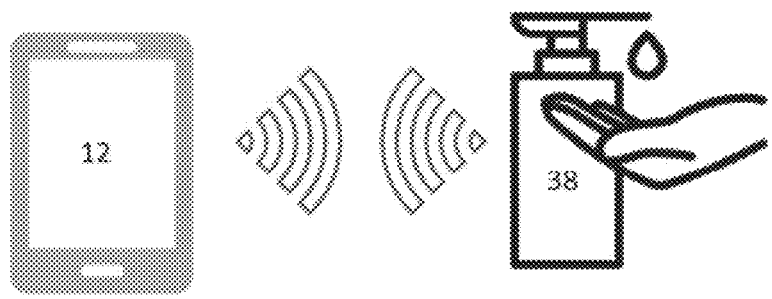

Reference is now made to FIG. 9, which provides a diagram of a method of conducting two-way communication between a smartphone 12 and a smart hand cleaning fluid dispenser 38 in accordance with a second embodiment of the invention. The method depicted in FIG. 9 is similar to the methods described above, and proceeds in four steps. In the first step, the smart hand cleaning fluid dispenser 38 is ready to receive a command via NFC. In the second step, the smartphone 12 is brought into proximity to the smart hand cleaning fluid dispenser 38, and the smartphone 12 transmits a write command via NFC to the smart hand cleaning fluid dispenser 38. In the third step, the smart hand cleaning fluid dispenser 38 enters a silent mode, in which the smart hand cleaning fluid dispenser 38 is unable to communicate with the smartphone 12 via NFC. The smart hand cleaning fluid dispenser 38 processes the write command and writes a response while in the silent mode. In the fourth step, the smart hand cleaning fluid dispenser 38 deactivates the silent mode, and the smartphone 12 reads the response via NFC.

It will be understood that, although various features of the invention have been described with respect to one or another of the embodiments of the invention, the various features and embodiments of the invention may be combined or used in conjunction with other features and embodiments of the invention as described and illustrated herein.

The present invention can be used for conducting two-way communication between any two NFC enabled devices, and is not limited to the example of a paper towel dispenser 10 and a smartphone 12 as shown in the drawings. For example, the method could be used for conducting two-way communication between two smartphones 12. The method could also be used for conducting two-way communication between a smartphone 12 and any other smart device, such as a smart hygiene apparatus. The smart hygiene apparatus could, for example, be a paper towel dispenser 10, a hand cleaning fluid dispenser 38, a toilet paper dispenser, a waste bin, a hand dryer, a faucet, a sink, or a body wash dispenser. The method could also be used for communication with any other NFC enabled devices, which might include for example: household appliances, refrigerators, microwaves, ovens, dishwashers, electronics, computers, thermostats, televisions, speakers, headphones, video game consoles, tablets, vehicles, automobiles, watercraft, e-bikes, bicycles, and scooters.

The invention is not limited to the particular constructions of the first NFC enabled device 12, the second NFC enabled device 10, and the NFC chip 24 shown in the drawings. Rather, any suitable construction of the first NFC enabled device 12, the second NFC enabled device 10, and the NFC chip 24 could be used.

The invention is not limited to the particular examples of methods for enabling the silent mode that have been described with respect to the preferred embodiments. Rather, any suitable method that causes the first NFC enabled device 12 to be unable to detect, recognize, and/or communicate with the second NFC enabled device 10 via NFC could be used. The method used to activate and deactivate the silent mode could include one or more of: computational methods, electronic methods, mechanical methods, electromagnetic methods, magnetic methods, and/or combinations thereof.

The two-way communication enabled by the invention may be used for any desired purpose. Some examples of possible uses include: updating firmware of the second NFC enabled device 10; configuring a setting of the second NFC enabled device 10; configuring a Wi-Fi connection of the second NFC enabled device 10; performing troubleshooting on the second NFC enabled device 10; performing log streaming of the second NFC enabled device 10; collecting data from the second NFC enabled device 10; and updating software of the second NFC enabled device 10. The method in accordance with the invention preferably allows for an unlimited number of messages to be exchanged between the first NFC enabled device 12 and the second NFC enabled device 10, without requiring the two devices 12, 10 to be repeatedly separated and tapped together. The method also preferably allows the first NFC enabled device 12 and/or the second NFC enabled device 10 to request that data be re-read or re-processed, for example due to a detected error or malfunction.

For example, in the embodiment shown in FIG. 1, the smart module 18 may be configured to illuminate the first LED light 20 when the amount of paper towels in the paper towel dispenser 10 falls below a preselected threshold, such as below 25% of the storage capacity of the dispenser 10, to signal to maintenance staff that the paper towels need to be replenished. The owner or manager of the paper towel dispenser 10 may subsequently decide to change the preselected threshold to below 50% of the storage capacity of the dispenser 10, for example because at the previous setting the dispenser 10 was running out of paper towels before maintenance staff were able to replenish the supply. To update this setting in the smart module 18, the owner or maintenance staff may, for example, open a mobile application on his or her smartphone 12, enter the desired setting change in the application, and then place the smartphone 12 against the smart module 18 of the paper towel dispenser 10. The smartphone 12 then preferably engages in two-way communication with the smart module 18 via NFC, using the method as described herein, in order to update the setting in the smart module 18. Advantageously, the method of the present invention allows the smartphone 12 to be used to engage in the two-way communication with the smart module 18, even if the smartphone 12 is unable to use the peer-to-peer mode.

In at least some embodiments of the invention, when write commands are received by the second NFC enabled device 10 from the first NFC enabled device 12, the write commands are generally written in the memory 32 of the NFC chip 24 of the second NFC enabled device 10, where they can be accessed for processing by the second NFC enabled device 10. Optionally, in some embodiments of the invention, the first NFC enabled device 12 and/or the second NFC enabled device 10 may be configured so that, in at least some circumstances, the write commands are written in a portion of the memory 32 that is selected to extend the useful lifespan of the memory 32, such as in the first part 34 of the memory 32 shown in FIG. 3.

Although the first NFC enabled device 12 is described in the preferred embodiments as transmitting a write command, and the second NFC enabled device 10 is described in the preferred embodiments as providing a response, the invention is not strictly limited to these forms of messages. Rather, in at least some embodiments of the invention the first NFC enabled device 12 may be configured to transmit a message to the second NFC enabled device 10 that is not in the form of a command, and the second NFC enabled device 10 may be configured to provide a message that is not in the form of a response to a command. For example, the second NFC enabled device 10 could be configured to write a command in the memory 32 of the second NFC enabled device 10, which is then read and processed by the first NFC enabled device 12. The first NFC enabled device 12 may then transmit a message to the second NFC enabled device 10 which is a response to the command. The second NFC enabled device 10 may, for example, request credentials from the first NFC enabled device 12 by writing the request in the memory 32 of the second NFC enabled device 10, and upon reading the request in the memory 32 of the second NFC enabled device, the first NFC enabled device 12 may respond by transmitting the credentials.

Preferably, the smart module 18 is configured to activate the silent mode upon receipt of a write command from the smartphone 12, regardless of the content of the command received, and without requiring any instructions from the smartphone 12 as to how to activate the silent mode. This preferably allows for more efficient two-way communication, by reducing the number of messages required.

Although the paper towel dispenser 10 has been described in the preferred embodiments as including the microcontroller 40, the invention is not limited to the microcontroller 40 as shown and described. Rather, any suitable component or components that are capable of processing and communicating data to enable the two-way communication between the first NFC enabled device 10 and the second NFC enabled device 12 could be used. For example, in an alternative embodiment of the invention the NFC chip 24 could optionally be constructed, programmed, adapted, and/or configured to perform some or all of the functions of the microcontroller 40, and the microcontroller 40 could optionally be omitted.

Although this disclosure has described and illustrated certain preferred embodiments of the invention, it is to be understood that the invention is not restricted to these particular embodiments. Rather, the invention includes all embodiments which are functional, electrical, electromagnetic, or mechanical equivalents of the specific embodiments and features that have been described and illustrated herein.

We claim:

1. A method of conducting two-way communication between a first NFC enabled device and a second NFC enabled device, the method comprising:
    placing the first NFC enabled device and the second NFC enabled device in proximity;
    transmitting a first message from the first NFC enabled device to the second NFC enabled device;
    activating a silent mode of the second NFC enabled device after receipt of the first message;
    using the second NFC enabled device to process the first message and write a second message in a memory of the second NFC enabled device;
    deactivating the silent mode of the second NFC enabled device; and
    using the first NFC enabled device to read the second message in the memory of the second NFC enabled device;
    wherein the presence of the second NFC enabled device is hidden from the first NFC enabled device when the second NFC enabled device is in the silent mode.

2. The method according to claim 1, wherein the second NFC enabled device processes the first message during a processing time; and
    wherein the second NFC enabled device is in the silent mode during at least part of the processing time.

3. The method according to claim 2, wherein the first NFC enabled device comprises a smartphone; and
wherein the second NFC enabled device comprises a hygiene apparatus.

4. The method according to claim 3, wherein the first NFC enabled device operates in a reader/writer mode when communicating with the second NFC enabled device;
wherein the first NFC enabled device is configured to read the memory of the second NFC enabled device upon detecting the presence of the second NFC enabled device;
wherein activating the silent mode of the second NFC enabled device comprises deactivating a demodulator of the second NFC enabled device;
wherein deactivating the silent mode of the second NFC enabled device comprises activating the demodulator of the second NFC enabled device; and
wherein the second NFC enabled device is unable to communicate with the first NFC enabled device via NFC when the second NFC enabled device is in the silent mode.

5. The method according to claim 4, wherein the second NFC enabled device is configured to activate the silent mode upon receipt of the first message from the first NFC enabled device;
wherein the second NFC enabled device is configured to deactivate the silent mode upon completion of the processing of the first message and the writing of the second message in the memory of the second NFC enabled device;
wherein the memory of the second NFC enabled device comprises a first part and a second part;
wherein the first part comprises a RAM type memory;
wherein the second part comprises an EPROM type memory;
wherein the size of the second message is selected based on a storage capacity of the RAM type memory;
wherein the second message is written in the RAM type memory; and
wherein the memory of the second NFC enabled device comprises a memory of an NFC chip of the second NFC enabled device.

6. The method according to claim 5, wherein the first message comprises a write command and the second message comprises a response to the write command;
wherein the method has a first communication cycle that comprises:
the transmission of the write command from the first NFC enabled device to the second NFC enabled device;
the activation of the silent mode of the second NFC enabled device after the write command has been transmitted from the first NFC enabled device to the second NFC enabled device;
the use of the second NFC enabled device to process the write command and write the response in the memory of the second NFC enabled device;
the deactivation of the silent mode of the second NFC enabled device after completion of the processing of the write command and the writing of the response in the memory of the second NFC enabled device; and
the use of the first NFC enabled device to read the response in the memory of the second NFC enabled device;
wherein the write command is a first write command and the response is a first response;
the method further comprising a second communication cycle, the second communication cycle comprising:
after the first NFC enabled device reads the first response in the memory of the second NFC enabled device, transmitting a second write command from the first NFC enabled device to the second NFC enabled device;
activating the silent mode of the second NFC enabled device after the second write command has been transmitted from the first NFC enabled device to the second NFC enabled device;
using the second NFC enabled device to process the second write command and write a second response in the memory of the second NFC enabled device;
deactivating the silent mode of the second NFC enabled device after completion of the processing of the second write command and the writing of the second response in the memory of the second NFC enabled device; and
using the first NFC enabled device to read the second response in the memory of the second NFC enabled device.

7. The method according to claim 6, wherein the first response comprises a first portion of a complete response to the first write command;
wherein the second response comprises a second portion of the complete response to the first write command;
wherein the second write command comprises an acknowledgement that the first response has been read by the first NFC enabled device; and
wherein processing the second write command comprises determining, from the second write command, whether the first response has been successfully read by the first NFC enabled device.

8. The method according to claim 7, wherein the method comprises a plurality of communication cycles, the plurality of communication cycles including the first communication cycle and the second communication cycle;
wherein, in each of the plurality of communication cycles:
one of a plurality of write commands is transmitted from the first NFC enabled device to the second NFC enabled device;
the silent mode of the second NFC enabled device is activated after the one of the plurality of write commands is transmitted to the second NFC enabled device;
the second NFC enabled device processes the one of the plurality of write commands and writes one of a plurality of responses in the memory of the second NFC enabled device;
the silent mode of the second NFC enabled device is deactivated after completion of the processing of the one of the plurality of write commands and the writing of the one of the plurality of responses in the memory of the second NFC enabled device; and
the first NFC enabled device detects the presence of the second NFC enabled device after the silent mode of the second NFC enabled device has been deactivated, which triggers the first NFC enabled device to read the one of the plurality of responses in the memory of the second NFC enabled device;
wherein at least some of the plurality of responses are partial responses to one or more of the plurality of write commands;
wherein each one of the partial responses is written in the memory of the second NFC enabled device in a separate one of the plurality of communication cycles;
wherein, in each of the plurality of communication cycles, the first NFC enabled device is configured to determine, based on the one of the plurality of responses in the memory of the second NFC enabled device, whether the one of the plurality of responses is a said partial response; and wherein the method is used for at least one of:
updating firmware of the second NFC enabled device;
configuring a setting of the second NFC enabled device;
configuring a Wi-Fi connection of the second NFC enabled device;
performing troubleshooting on the second NFC enabled device;
performing log streaming of the second NFC enabled device;
collecting data from the second NFC enabled device; and
updating software of the second NFC enabled device.

9. The method according to claim 2, wherein the first NFC enabled device operates in a reader/writer mode when communicating with the second NFC enabled device.

10. The method according to claim 2, wherein the first NFC enabled device is configured to read the memory of the second NFC enabled device upon detecting the presence of the second NFC enabled device.

11. The method according to claim 2, wherein activating the silent mode of the second NFC enabled device comprises deactivating a demodulator of the second NFC enabled device;
wherein deactivating the silent mode of the second NFC enabled device comprises activating the demodulator of the second NFC enabled device; and
wherein the second NFC enabled device is unable to communicate with the first NFC enabled device via NFC when the second NFC enabled device is in the silent mode.

12. The method according to claim 2, wherein the second NFC enabled device is configured to activate the silent mode upon receipt of the first message from the first NFC enabled device.

13. The method according to claim 2, wherein the second NFC enabled device is configured to deactivate the silent mode upon completion of the processing of the first message and the writing of the second message in the memory of the second NFC enabled device.

14. The method according to claim 2, wherein the memory of the second NFC enabled device comprises a first part and a second part;
wherein the first part comprises a RAM type memory;
wherein the second part comprises an EPROM type memory;
wherein the size of the second message is selected based on a storage capacity of the RAM type memory;
wherein the second message is written in the RAM type memory; and
wherein the memory of the second NFC enabled device comprises a memory of an NFC chip of the second NFC enabled device.

15. The method according to claim 2, wherein the first message comprises a write command and the second message comprises a response to the write command.

16. The method according to claim 15, wherein the method has a first communication cycle that comprises:
the transmission of the write command from the first NFC enabled device to the second NFC enabled device;
the activation of the silent mode of the second NFC enabled device after the write command has been transmitted from the first NFC enabled device to the second NFC enabled device;
the use of the second NFC enabled device to process the write command and write the response in the memory of the second NFC enabled device;
the deactivation of the silent mode of the second NFC enabled device after completion of the processing of the write command and the writing of the response in the memory of the second NFC enabled device; and
the use of the first NFC enabled device to read the response in the memory of the second NFC enabled device;
wherein the write command is a first write command and the response is a first response;
the method further comprising a second communication cycle, the second communication cycle comprising:
after the first NFC enabled device reads the first response in the memory of the second NFC enabled device, transmitting a second write command from the first NFC enabled device to the second NFC enabled device;
activating the silent mode of the second NFC enabled device after the second write command has been transmitted from the first NFC enabled device to the second NFC enabled device;
using the second NFC enabled device to process the second write command and write a second response in the memory of the second NFC enabled device;
deactivating the silent mode of the second NFC enabled device after completion of the processing of the second write command and the writing of the second response in the memory of the second NFC enabled device; and
using the first NFC enabled device to read the second response in the memory of the second NFC enabled device.

17. The method according to claim 16, wherein the first response comprises a first portion of a complete response to the first write command; and
wherein the second response comprises a second portion of the complete response to the first write command.

18. The method according to claim 16, wherein the second write command comprises an acknowledgement that the first response has been read by the first NFC enabled device; and
wherein processing the second write command comprises determining, from the second write command, whether the first response has been successfully read by the first NFC enabled device.

19. The method according to claim 16, wherein the method comprises a plurality of communication cycles, the plurality of communication cycles including the first communication cycle and the second communication cycle;
wherein, in each of the plurality of communication cycles:
one of a plurality of write commands is transmitted from the first NFC enabled device to the second NFC enabled device;
the silent mode of the second NFC enabled device is activated after the one of the plurality of write commands is transmitted to the second NFC enabled device;
the second NFC enabled device processes the one of the plurality of write commands and writes one of a plurality of responses in the memory of the second NFC enabled device;
the silent mode of the second NFC enabled device is deactivated after completion of the processing of the one of the plurality of write commands and the writing of the one of the plurality of responses in the memory of the second NFC enabled device; and
the first NFC enabled device detects the presence of the second NFC enabled device after the silent mode of the second NFC enabled device has been deactivated, which triggers the first NFC enabled device to read the one of the plurality of responses in the memory of the second NFC enabled device;

wherein at least some of the plurality of responses are partial responses to one or more of the plurality of write commands;

wherein each one of the partial responses is written in the memory of the second NFC enabled device in a separate one of the plurality of communication cycles; and wherein, in each of the plurality of communication cycles, the first NFC enabled device is configured to determine, based on the one of the plurality of responses in the memory of the second NFC enabled device, whether the one of the plurality of responses is a said partial response.

20. The method according to claim 2, wherein the method is used for at least one of:

updating firmware of the second NFC enabled device;
configuring a setting of the second NFC enabled device;
configuring a Wi-Fi connection of the second NFC enabled device;
performing troubleshooting on the second NFC enabled device;
performing log streaming of the second NFC enabled device;
collecting data from the second NFC enabled device; and
updating software of the second NFC enabled device.

* * * * *